US011870588B2

(12) United States Patent
Sun et al.

(10) Patent No.: US 11,870,588 B2
(45) Date of Patent: Jan. 9, 2024

(54) FEEDBACK PROCESS REUSE IN WIRELESS COMMUNICATIONS

(71) Applicant: QUALCOMM Incorporated, San Diego, CA (US)

(72) Inventors: Jing Sun, San Diego, CA (US);
Xiaoxia Zhang, San Diego, CA (US);
Tao Luo, San Diego, CA (US);
Wooseok Nam, San Diego, CA (US);
Juan Montojo, San Diego, CA (US);
Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/323,950

(22) Filed: May 18, 2021

(65) Prior Publication Data

US 2022/0376837 A1 Nov. 24, 2022

(51) Int. Cl.
*H04L 5/00* (2006.01)
*H04L 1/1812* (2023.01)
*H04W 72/20* (2023.01)
*H04W 72/23* (2023.01)

(52) U.S. Cl.
CPC .......... *H04L 1/1816* (2013.01); *H04L 5/0055* (2013.01); *H04W 72/20* (2023.01); *H04W 72/23* (2023.01)

(58) Field of Classification Search
CPC .... H04L 1/1816; H04L 5/0055; H04W 72/20; H04W 72/23
See application file for complete search history.

(56) References Cited

U.S. PATENT DOCUMENTS

| 2009/0287976 A1* | 11/2009 | Wang | H04L 1/1812 |
| | | | 714/E11.131 |
| 2010/0095183 A1* | 4/2010 | Petrovic | H04L 1/1887 |
| | | | 714/748 |
| 2019/0182865 A1* | 6/2019 | Falahati | H04W 74/004 |

(Continued)

FOREIGN PATENT DOCUMENTS

| WO | WO-2020091578 A1 | 5/2020 |
| WO | WO-2020199128 A1 | 10/2020 |
| WO | WO-2021007342 A1 | 1/2021 |

OTHER PUBLICATIONS

International Search Report and Written Opinion—PCT/US2022/072053—ISA/EPO—dated Aug. 11, 2022.

*Primary Examiner* — Michael J Moore, Jr.
(74) *Attorney, Agent, or Firm* — Holland & Hart LLP

(57) ABSTRACT

Methods, systems, and devices for wireless communications are described. A downlink message associated with a feedback process identifier may be received at a first time. An uplink feedback message for the downlink message may be scheduled for a third time. Another downlink message associated with the feedback process identifier may be received after the first time and before the third time. Additionally or alternatively, an uplink grant associated with a feedback process identifier may be received at a first time. An uplink message may be scheduled by the uplink grant for a third time. Another uplink grant associated with the feedback process identifier may be received after the first time and before the third time, and another uplink message may be scheduled by the other uplink grant for a fourth time after the third time.

30 Claims, 15 Drawing Sheets

(56) References Cited

U.S. PATENT DOCUMENTS

| | | | |
|---|---|---|---|
| 2020/0059330 A1* | 2/2020 | Wong | H04L 1/1822 |
| 2020/0244403 A1* | 7/2020 | Talarico | H04L 1/1822 |
| 2020/0322979 A1* | 10/2020 | Chatterjee | H04L 5/14 |
| 2021/0014009 A1* | 1/2021 | Khoshnevisan | H04L 5/0055 |
| 2021/0083806 A1* | 3/2021 | Zou | H04L 1/1819 |
| 2021/0100013 A1* | 4/2021 | Khoshnevisan | H04L 5/0055 |
| 2021/0315053 A1* | 10/2021 | Kim | H04W 80/02 |
| 2021/0377985 A1* | 12/2021 | Awoniyi-Oteri | H04L 1/1822 |
| 2021/0377986 A1* | 12/2021 | Awoniyi-Oteri | H04W 72/1273 |
| 2021/0410174 A1* | 12/2021 | Lin | H04W 72/23 |
| 2022/0060288 A1* | 2/2022 | Sun | H04L 1/1896 |
| 2022/0104242 A1* | 3/2022 | Wu | H04L 1/1893 |
| 2022/0225396 A1 | 7/2022 | Lin et al. | |
| 2022/0231795 A1* | 7/2022 | Lei | H04L 1/08 |
| 2022/0329363 A1* | 10/2022 | Lee | H04L 1/1812 |
| 2022/0376837 A1* | 11/2022 | Sun | H04W 72/23 |
| 2022/0386329 A1* | 12/2022 | Yu | H04L 1/1812 |
| 2023/0006779 A1* | 1/2023 | Ahn | H04L 1/1642 |

* cited by examiner

FEEDBACK PROCESS REUSE IN WIRELESS COMMUNICATIONS

FIELD OF TECHNOLOGY

The following relates to wireless communications, including feedback process reuse in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support feedback process reuse in wireless communications.

A method for wireless communications at a user equipment (UE) is described. The method may include receiving, at a first time, a first downlink message associated with a feedback process identifier, where a first uplink feedback message indicating acknowledgment feedback for the first downlink message is scheduled for a third time after the first time, receiving, at a second time that is after the first time and before the third time, a second downlink message associated with the feedback process identifier, and transmitting, after receiving the first downlink message and the second downlink message, the first uplink feedback message indicating acknowledgment feedback for the first downlink message, a second uplink feedback message indicating acknowledgment feedback for the second downlink message, or any combination thereof.

An apparatus for wireless communications at a UE is described. The apparatus may include a processor, memory coupled with the processor, and instructions stored in the memory. The instructions may be executable by the processor to cause the apparatus to receive, at a first time, a first downlink message associated with a feedback process identifier, where a first uplink feedback message indicating acknowledgment feedback for the first downlink message is scheduled for a third time after the first time, receive, at a second time that is after the first time and before the third time, a second downlink message associated with the feedback process identifier, and transmit, after receiving the first downlink message and the second downlink message, the first uplink feedback message indicating acknowledgment feedback for the first downlink message, a second uplink feedback message indicating acknowledgment feedback for the second downlink message, or any combination thereof.

Another apparatus for wireless communications at a UE is described. The apparatus may include means for receiving, at a first time, a first downlink message associated with a feedback process identifier, where a first uplink feedback message indicating acknowledgment feedback for the first downlink message is scheduled for a third time after the first time, means for receiving, at a second time that is after the first time and before the third time, a second downlink message associated with the feedback process identifier, and means for transmitting, after receiving the first downlink message and the second downlink message, the first uplink feedback message indicating acknowledgment feedback for the first downlink message, a second uplink feedback message indicating acknowledgment feedback for the second downlink message, or any combination thereof.

A non-transitory computer-readable medium storing code for wireless communications at a UE is described. The code may include instructions executable by a processor to receive, at a first time, a first downlink message associated with a feedback process identifier, where a first uplink feedback message indicating acknowledgment feedback for the first downlink message is scheduled for a third time after the first time, receive, at a second time that is after the first time and before the third time, a second downlink message associated with the feedback process identifier, and transmit, after receiving the first downlink message and the second downlink message, the first uplink feedback message indicating acknowledgment feedback for the first downlink message, a second uplink feedback message indicating acknowledgment feedback for the second downlink message, or any combination thereof.

Some examples of the method, apparatuses, and non-transitory computer-readable medium described herein may further include operations, features, means, or instructions for determining that a value of a first new data indicator associated with the first downlink message may be different than a value of a second new data indicator associated with the second downlink message and processing data included in the second downlink message as new data relative to data included in the first downlink message based on the value of the first new data indicator being different than the value of the second new data indicator.

Some examples of the method, apparatuses, and non-transitory computer-readable medium described herein may further include operations, features, means, or instructions for determining that a value of a first new data indicator associated with the first downlink message matches a value of a second new data indicator associated with the second downlink message, determining, based on the value of the first new data indicator matching the value of the second new data indicator, that the UE failed to receive an intervening downlink message associated with the feedback process identifier, the intervening downlink message transmitted between the first downlink message and the second downlink message, and processing data included in the second downlink message as new relative to data include in the first downlink message based on determining that the UE failed to receive the intervening downlink message.

Some examples of the method, apparatuses, and non-transitory computer-readable medium described herein may further include operations, features, means, or instructions for decoding the first downlink message, where the transmitting includes transmitting the first uplink feedback message, and where the first uplink feedback message includes an acknowledgment message based on successfully decoding the first downlink message.

In some examples of the method, apparatuses, and non-transitory computer-readable medium described herein, the second uplink feedback message may be scheduled for a fourth time after the third time and the method, apparatuses, and non-transitory computer-readable medium may include further operations, features, means, or instructions for decoding the second downlink message, where the transmitting includes transmitting the second uplink feedback message after the first uplink feedback message, and where the second uplink feedback message includes a second acknowledgment message based on successfully decoding the second downlink message.

Some examples of the method, apparatuses, and non-transitory computer-readable medium described herein may further include operations, features, means, or instructions for decoding the second downlink message, where the transmitting includes transmitting the second uplink feedback message concurrent with the first uplink feedback message, and where the second uplink feedback message includes a second acknowledgment message based on successfully decoding the second downlink message.

In some examples of the method, apparatuses, and non-transitory computer-readable medium described herein, successfully decoding the first downlink message and identifying a failure to decode the second downlink message, where the transmitting includes transmitting the second uplink feedback message and refraining from transmitting the first uplink feedback message, and where the second uplink feedback message includes a negative acknowledgment message corresponding to the feedback process identifier based on the failure to decode the second downlink message.

Some examples of the method, apparatuses, and non-transitory computer-readable medium described herein may further include operations, features, means, or instructions for receiving a message configuring a mode for indicating acknowledgment feedback on a per-feedback-process basis, where the transmitting includes transmitting an acknowledgment message including a first bit indicating acknowledgment feedback for the first downlink message and a second bit indicating acknowledgment feedback for the second downlink message.

In some examples of the method, apparatuses, and non-transitory computer-readable medium described herein, the transmitting includes transmitting the first uplink feedback message including a negative acknowledgment message for the first downlink message and the method, apparatuses, and non-transitory computer-readable medium may include further operations, features, means, or instructions for receiving, after transmitting the first uplink feedback message including the negative acknowledgment message for the first downlink message, a third downlink message associated with the feedback process identifier or a second feedback process identifier, where the third downlink message includes data transmitted in the first downlink message based on the negative acknowledgment message.

In some examples of the method, apparatuses, and non-transitory computer-readable medium described herein, a duration between the first time and the second time satisfies a threshold associated with reusing feedback process identifiers.

In some examples of the method, apparatuses, and non-transitory computer-readable medium described herein, the feedback process identifier includes a hybrid automatic repeat request process identifier.

A method for wireless communications at a UE is described. The method may include receiving, at a first time, a first uplink grant associated with a feedback process identifier, where a first uplink message associated with the feedback process identifier is scheduled for a third time after the first time based on the first uplink grant, receiving, at a second time that is after the first time and before the third time, a second uplink grant associated with the feedback process identifier, where a second uplink message associated with the feedback process identifier is scheduled for a fourth time after the second time based on the second uplink grant, and transmitting, to a base station, the first uplink message associated with the feedback process identifier after receiving the second uplink grant associated with the feedback process identifier.

An apparatus for wireless communications at a UE is described. The apparatus may include a processor, memory coupled with the processor, and instructions stored in the memory. The instructions may be executable by the processor to cause the apparatus to receive, at a first time, a first uplink grant associated with a feedback process identifier, where a first uplink message associated with the feedback process identifier is scheduled for a third time after the first time based on the first uplink grant, receive, at a second time that is after the first time and before the third time, a second uplink grant associated with the feedback process identifier, where a second uplink message associated with the feedback process identifier is scheduled for a fourth time after the second time based on the second uplink grant, and transmit, to a base station, the first uplink message associated with the feedback process identifier after receiving the second uplink grant associated with the feedback process identifier.

Another apparatus for wireless communications at a UE is described. The apparatus may include means for receiving, at a first time, a first uplink grant associated with a feedback process identifier, where a first uplink message associated with the feedback process identifier is scheduled for a third time after the first time based on the first uplink grant, means for receiving, at a second time that is after the first time and before the third time, a second uplink grant associated with the feedback process identifier, where a second uplink message associated with the feedback process identifier is scheduled for a fourth time after the second time based on the second uplink grant, and means for transmitting, to a base station, the first uplink message associated with the feedback process identifier after receiving the second uplink grant associated with the feedback process identifier.

A non-transitory computer-readable medium storing code for wireless communications at a UE is described. The code may include instructions executable by a processor to receive, at a first time, a first uplink grant associated with a feedback process identifier, where a first uplink message associated with the feedback process identifier is scheduled for a third time after the first time based on the first uplink grant, receive, at a second time that is after the first time and before the third time, a second uplink grant associated with the feedback process identifier, where a second uplink message associated with the feedback process identifier is scheduled for a fourth time after the second time based on the second uplink grant, and transmit, to a base station, the first uplink message associated with the feedback process identifier after receiving the second uplink grant associated with the feedback process identifier.

Some examples of the method, apparatuses, and non-transitory computer-readable medium described herein may further include operations, features, means, or instructions for determining that a value of a second new data indicator included in the second uplink grant may be different than a value of a first new data indicator included in the first uplink grant and transmitting the second uplink message associated with the feedback process identifier, where the first uplink message associated with the feedback process identifier includes first data, and where the second uplink message associated with the feedback process identifier includes new data relative to the first data based on the value of the second new data indicator being different than the value of the first new data indicator.

In some examples of the method, apparatuses, and non-transitory computer-readable medium described herein, a duration between transmitting the first uplink message and the second uplink message satisfies a threshold associated with reusing feedback process identifiers.

Some examples of the method, apparatuses, and non-transitory computer-readable medium described herein may further include operations, features, means, or instructions for determining that a value of a second new data indicator included in the second uplink grant matches a value of a first new data indicator included in the first uplink grant, identifying, based on the value of the second new data indicator matching the value of the first new data indicator, a failure to receive an intervening uplink grant associated with the feedback process identifier and transmitted between the first uplink grant and the second uplink grant, and transmitting the second uplink message associated with the feedback process identifier, where the first uplink message associated with the feedback process identifier includes first data, and where the second uplink message associated with the feedback process identifier includes new data relative to the first data based on identifying the failure to receive the intervening uplink grant.

Some examples of the method, apparatuses, and non-transitory computer-readable medium described herein may further include operations, features, means, or instructions for removing, from a buffer, data included in the first uplink message based on a value of a second new data indicator included in the second uplink grant being different than a value of a first new data indicator included in the first uplink grant.

Some examples of the method, apparatuses, and non-transitory computer-readable medium described herein may further include operations, features, means, or instructions for receiving, via higher-layer signaling, an indication that the data included in the first uplink message was unsuccessfully processed at the base station, where the higher-layer signaling includes packet data convergence protocol layer signaling, radio link control layer signaling, or both and retransmitting the data to the base station based on the indication.

Some examples of the method, apparatuses, and non-transitory computer-readable medium described herein may further include operations, features, means, or instructions for receiving, after transmitting the first uplink message associated with the feedback process identifier, a third uplink grant associated with the feedback process identifier or a different feedback process identifier, where a third uplink message associated with the feedback process identifier may be scheduled based on the third uplink grant, and where retransmitting the data includes transmitting the third uplink message.

In some examples of the method, apparatuses, and non-transitory computer-readable medium described herein, the feedback process identifier includes a hybrid automatic repeat request process identifier.

DETAILED DESCRIPTION

Figure 1:
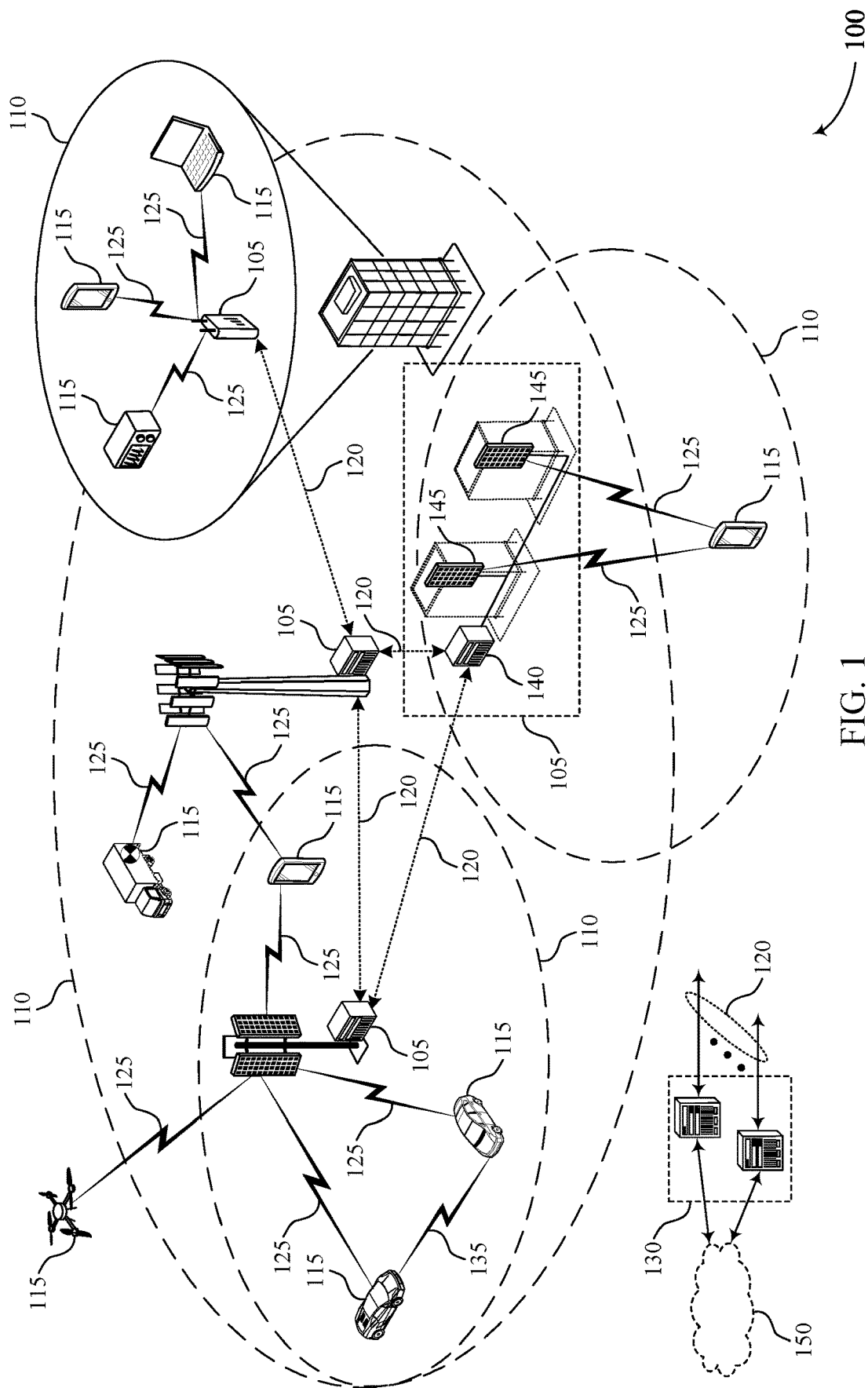
FIG. 1 illustrates an example of a wireless communications system that supports feedback process reuse in wireless communications in accordance with aspects of the present disclosure.

A hybrid automatic repeat request (HARQ) or other feedback process may be configured to increase a likelihood that data will be successfully communicated from a transmitting device to a receiving device. A feedback process may include communicating feedback acknowledging whether data transmitted from a transmitting device was successfully processed (e.g., received and decoded) at a receiving device. A feedback process may in some cases further include retransmitting the data in one or more subsequent messages until the data is successfully processed (or a threshold quantity of retransmissions occur) if the receiving device indicates the data was unsuccessfully processed. In some examples, to increase a likelihood that a retransmission will be successfully processed, the data may be retransmitted using modified transmission techniques, and the receiving device may combine the retransmitted data with the original data during a decoding process—which may be referred to as soft-combining.

In some wireless communications systems, multiple feedback processes (e.g., multiple HARQ processes) may be supported, with each feedback process corresponding to a unique respective feedback process identifier (e.g., HARQ process identifier). The multiple feedback processes may enable data to be communicated between the transmitting device and the receiving device at an increased rate. For example, data corresponding to one feedback process may be transmitted while a retransmission associated with another feedback process is pending. Or, as another example, data associated with one feedback process may be transmitted during a duration when another feedback process is inactive—e.g., when data associated with the other feedback process is being processed by a transmitting or receiving device. Examples herein may be provided with reference to HARQ processes and HARQ feedback, but it is to be understood that the teachings herein may be extended to any type of feedback and related feedback processes.

In some examples, communication resources may be scheduled for communicating HARQ feedback based on a received downlink message and a duration for processing the data in the downlink message. For example, a feedback message (e.g., acknowledgement message) may be scheduled to occur at least a duration after a corresponding message is received, so as to give the receiving device sufficient time to process the received message before communicating related feedback. In some examples, a duration for processing a received message may be similar (e.g., in terms of absolute time allotted) for communications using different subcarrier spacings, but a quantity of symbols or even slots that within a given duration of time may increase as a subcarrier spacing increases. Thus, to support full or more full occupation of a communications channel using a larger subcarrier spacing (e.g., a higher frequency range), one option may be to increase the quantity of HARQ processes supported by a wireless communications system, so that additional transmissions associated with additional HARQ processes may occur during the processing windows for messages associated with other HARQ process. Increasing the quantity of HARQ processes supported by a wireless communications system may have drawbacks, however, such as increased complexity and related hardware requirements (e.g., memory space) for a communications device related to tracking and processing communications associated with an increased quantity of different HARQ processes.

To reduce or avoid an undesirable increase in the quantity of HARQ processes configured for a communication device, techniques as described herein may be used, which may allow a HARQ process (e.g., a HARQ process corresponding to a particular HARQ process ID) to be reused before an uplink resource associated with the HARQ process is scheduled to occur. A first message associated with a HARQ process may transmitted and received in a first direction (e.g., downlink or uplink), with a corresponding message scheduled to occur at least some minimum duration later in a second direction (e.g., uplink or downlink), but a second message associated with the same HARQ process may transmitted and received in the first direction prior to when the corresponding message for the first message is scheduled to occur. A new data indicator (NDI) may be changed (e.g., flipped, toggled) as between the first and second messages associated with the HARQ process, to allow a receiving device to identify the second message as including new data relative to the first message (e.g., as opposed to being a retransmission of data from the first message).

Thus, for example, a first downlink message associated with a HARQ process identifier may received at a first time, and a corresponding first uplink feedback message associated with the same HARQ process identifier may be scheduled for some third time that is at least a certain duration after the first time. But before the first uplink feedback message is transmitted—that is, at some second time in between the first and third times—a second downlink message associated with the same HARQ process identifier may also be received. Thus, in some cases, a second message may be received in association with a HARQ process identifier before a feedback message is transmitted for a first (earlier received) message associated with the same HARQ process identifier. An NDI for the second message associated with the HARQ process identifier may be different (e.g., flipped, toggled) relative to an NDI for the first message associated with the HARQ process identifier, which may allow the receiving device to recognize the second message as a new data transmission (e.g., as opposed to a retransmission of the data included in the first message).

In some examples, the first uplink feedback message is transmitted over a first uplink feedback resource after the second downlink message is received. In some examples, a second uplink feedback message for the second downlink message is transmitted over the uplink feedback resource (e.g., instead of the first uplink feedback message and the first uplink feedback message is not transmitted). In some examples, the first uplink feedback message and the second uplink feedback message are both transmitted over the uplink feedback resource—e.g., using multiplexing. In some examples, the second uplink feedback message is transmitted over a second uplink feedback resource that occurs after the first uplink feedback message. By reusing the HARQ process identifier for a second downlink message before the first uplink feedback message is transmitted for the first downlink message, a quantity of configured HARQ processes may be reduced, or at least an increase the such a quantity may be avoided, which may reduce or at least avoid in increase in one or more complexities associated with communications between devices, and which may support increased spectral efficiency (e.g., more full use of a wireless resource).

As another example, a first uplink grant associated with a HARQ process identifier may be received at a first time, and a first uplink message may be scheduled by the first uplink grant for a third time after the first time. At some second time (e.g., after the first uplink grant is received and before the first uplink message is transmitted), a second uplink grant associated with the same HARQ process identifier may be received, and a second uplink message associated with the HARQ process identifier may be scheduled for some time after the third time (that is, after the time for which the first uplink message is scheduled). An NDI for the second grant associated with the HARQ process identifier may be different (e.g., flipped, toggled) relative to an NDI for the first grant associated with the HARQ process identifier, which may allow the receiving device to recognize the second uplink message as a new data transmission (e.g., as opposed to a retransmission of the data included in the first uplink message). After both uplink grants associated with the HARQ process identifier are received, the first uplink message (associated with the first grant) may be transmitted. By reusing the HARQ process identifier (e.g., communicating a second related grant) before the uplink message is scheduled to occur for the first uplink grant, a quantity of configured HARQ processes may be reduced, or at least an increase the such a quantity may be avoided, which may reduce or at least avoid in increase in one or more complexities associated with communications between devices, and which may support increased spectral efficiency (e.g., more full use of a wireless resource).

Aspects of the disclosure are initially described in the context of wireless communications systems. Aspects of the disclosure are also described in the context of resource diagrams and process flows. Aspects of the disclosure are further illustrated by and described with reference to apparatus diagrams, system diagrams, and flowcharts that relate to feedback process reuse in wireless communications.

FIG. 1 illustrates an example of a wireless communications system 100 that supports feedback process reuse in wireless communications in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Different frequency ranges may support communications between communication devices. In some examples, communications are performed using the frequency range between 25 GHz and 52 GHZ, which may be referred to as frequency range 2 (FR2). Communications may also be performed using the frequency range between 60 GHz and 71 GHz, which may be referred to as frequency range 2x (FR2x).

In some examples, the wireless spectrum in FR2x is unlicensed, and communications using the frequencies in FR2x follow contention-based protocols, such as listen-before-talk, to gain access to and occupy the wireless spectrum. In some examples, after gaining access to a channel (e.g., based on the detected energy during a clear channel assessment being below a threshold), a communication device may be permitted to access the channel for a designated time period (which may be referred to as a Channel Occupancy Time (COT)).

Different subcarrier spacings may be used for communications between communication devices—e.g., based on the frequency range. In some examples, in a first frequency range (e.g., FR2), a subcarrier spacing of 120 KHz may be used. In some examples, in a second frequency range (e.g., FR2x), a larger subcarrier spacing may be used (e.g., 480 KHz or 960 KHz). In some examples, the quantity of slots that divide a time interval is based on the subcarrier spacing and a quantity of symbols in a slot (e.g., a slot may include fourteen symbols). For example, a 1 millisecond interval may include 8 slots (and 112 symbols) if a subcarrier spacing of 120 KHz is used; 32 slots (and 448 symbols) if a subcarrier spacing of 480 KHz is used; 64 slots (and 896 symbols) if a subcarrier spacing of 960 KHz is used and so on. In some examples, slots may be used to schedule communications between communication devices—e.g., downlink shared channel resources for a UE may be scheduled during two or more slots.

Acknowledgement feedback reporting for communications may be used to increase a reliability of communications between communication devices. Acknowledgement feedback reporting may include reporting, by a receiving device to a transmitting device, whether a communication received from the transmitting device was successfully decoded or, in some examples, whether an expected communication from the transmitting device was received at all. In some examples, if a transmitting device receiving a negative acknowledgement indicating that the communication was not received at the receiving device, the transmitting device may retransmit the data included in the negatively acknowledged (or unacknowledged) communication to the receiving device.

HARQ techniques may be used to further increase a reliability of communications between communication devices. HARQ techniques may include retransmitting negatively acknowledged (or unacknowledged) using different modulation and/or coding techniques. In such cases, a receiving device may store an unsuccessfully decoded communication (which may be referred to as an initial transmission) and combine the unsuccessfully decoded communication with one or more retransmissions—e.g., until the data in the communication is successfully decoded. A HARQ process may support a set of HARQ communications (an initial retransmission and the one or more retransmissions). In some examples, multiple HARQ processes may support multiple sets of HARQ communications between communication devices. For example, one HARQ process may be used to communicate a first set of data and another HARQ process may be used to communicate a second set of data to a communication device—e.g., to increase a data rate of communications between the communication devices. In some examples, acknowledgement feedback used to support a HARQ process may be referred to as HARQ feedback. For downlink transmissions, a HARQ process associated with a transmission and a status of data included in the transmission may be included in a scheduling message (e.g., a DCI message). For uplink transmissions, a HARQ process associated with a transmission and a status of data included in the transmission may be included in an uplink grant (e.g., a DCI message).

For downlink transmissions, HARQ feedback may be reported to a base station using acknowledgment/negative acknowledgment (A/N) resources. In some examples, codebook reporting is used to report HARQ feedback for multiple downlink transmissions— different types of codebook reporting techniques may be configured. In some examples, semi-static reporting (or Type 1 HARQ feedback reporting) may be used to report feedback for a configured quantity of transport blocks. In some examples, dynamic reporting (or Type 2 HARQ feedback reporting) may be used to report feedback for a quantity of transport blocks indicated in downlink control information—e.g., using downlink assignment indicators. Both Type 1 and Type 2 HARQ feedback reporting may report HARQ feedback on a transport block (or code group) basis. In some examples, the ordering of the HARQ feedback in the codebook may be based on a timing of the transport blocks. In some examples, one-shot reporting (or Type 3 HARQ feedback reporting) may be used to report feedback for all of the HARQ process configured for a UE. Thus, the ordering of HARQ feedback in the codebook may be based on an index of a HARQ process identifier.

In some examples, the A/N resources may be scheduled based on a downlink shared channel resource used by a downlink transmission. For example, the A/N resource may occur a designated duration after an end of the downlink shared channel resource. In some examples, the designated duration is based on a higher-layer parameter, which may be referred to as a K1 timing parameter. For communications that use 120 KHz spacing, K1 may correspond to 20 or 24 symbols. For uplink transmissions, the HARQ feedback may be transmitted during uplink shared channel resources scheduled by an uplink grant. In some examples, the uplink shared channel resources may occur a designated duration after an end of the uplink grant. In some examples, the designated duration is given by a second higher-layer parameter, which may be referred to as a K2 timing parameter. For communications that use 120 KHz spacing, K2 may correspond to 36 symbols.

In addition to increasing a data rate of communications between communication devices, additional HARQ processes may be used to fill a channel between the communication devices. For communications over unlicensed spectrum, continuous transmissions over the unlicensed spectrum may be used to prevent other communication devices from gaining access to an occupying the unlicensed spectrum—e.g., before a COT period expires. In some examples, the additional HARQ processes may be used to fill a duration between an end of a downlink shared channel resource and an A/N resource (e.g., which may include 20 symbols or 24 symbols and be defined by a K1 timing parameter). Also, the additional HARQ processes may be used to fill a second duration between an end of the A/N resource and a reuse of a set of HARQ processes. The second duration may be based on a duration for processing the HARQ feedback and preparing new data transmissions, retransmission, or both, by a base station 105. In such cases, a HARQ process may be reused for a subsequent new transmission or retransmission after the first duration and the second duration have elapsed.

Similarly, the additional HARQ processes may be used to fill a duration between an end of an uplink grant and an uplink shared channel resource (e.g., which may include 36 symbols and be defined by a K2 timing parameter). Also, the additional HARQ processes may be used to fill a second duration between an end of the uplink shared channel and a next uplink grant. The second duration may be based on a duration for processing the uplink data by a base station 105.

In some examples, the timeline for processing HARQ feedback for communications using 120 KHz subcarrier spacing may also be used for communications using higher subcarrier spacings (e.g., 480 KHz or 960 KHz). That is, a duration between a downlink shared channel resource and a corresponding A/N resource may remain the same. Also, a duration between an uplink grant and an uplink shared channel resource may remain the same. Additionally, durations for processing received communications and generating HARQ feedback may remain the same. Accordingly, for communications with higher subcarrier spacings, an increased quantity of symbols (and thus slots) may separate these resources. For example, for a 480 KHz subcarrier spacing, a duration between an end of a downlink shared channel resource and an A/N resource may correspond to 80 or 96 symbols. And a duration between an end of an uplink grant and an uplink shared channel resource may correspond to 144 symbols. Also, for a 960 KHz subcarrier spacing, a duration between an end of a downlink shared channel resource and an A/N resource may correspond to 160 or 192 symbols. And a duration between an end of an uplink grant and an uplink shared channel resource may correspond to 288 symbols.

Accordingly, an increased quantity of HARQ process may be used to fill the durations between these communication resources relative to a smaller subcarrier spacing. In some examples, around 30 HARQ processes are configured for downlink transmissions, and around 60 HARQ process are configured for uplink transmissions—e.g., to ensure that a communication between communication devices continuously occupies an unlicensed channel. Reducing a quantity of HARQ processes configured for a communication device may decrease a processing load at the communication.

In some examples, to reduce the quantity of HARQ processes, the ability to soft-combine retransmissions may be disabled. In such cases, a HARQ process may be reused earlier in time. For example, for downlink transmissions, a HARQ process associated with a downlink transmission may be reused after (e.g., a symbol period after) an A/N resource for the downlink transmission occurs. In such cases, a base station may not wait until after the second duration for processing the HARQ feedback in the A/N resource expires before reusing the corresponding HARQ process for a new downlink transmission—e.g., because the HARQ feedback may not affect a subsequent downlink transmission associated with the HARQ process. Similarly, for uplink transmissions, a HARQ process associated with an uplink transmission may be reused after (e.g., a symbol period after) uplink shared channel resources for the uplink transmission is scheduled. In such cases, a base station may not wait until after the second duration for processing the uplink transmission expires before reusing the corresponding HARQ process for scheduling a new uplink transmission—e.g., the base station may assume the uplink transmission will be successfully received.

For higher subcarrier spacings, an excessive quantity of HARQ processes may be configured for a communication device—e.g., despite techniques for reducing the quantity of HARQ processes, such as disabling soft-combining, being used.

To further reduce the quantity of HARQ processes configured for a communication device, techniques may be established enabling HARQ processes to be reused before an uplink resource associated with the HARQ process is scheduled to occur. A first downlink message associated with a HARQ process identifier is received at a first time, and a first uplink feedback message is scheduled for the first downlink message for a third time. After the first downlink message is received and before the first uplink feedback message is transmitted, a second downlink message associated with the HARQ process identifier may be received. After the first downlink messages are received, the first uplink feedback message, a second uplink feedback message for the second downlink message, or both, may be transmitted.

In some examples, the first uplink feedback message is transmitted over a first uplink feedback resource after the second downlink message is received. In some examples, the second uplink feedback message is transmitted over the uplink feedback resource (and the first uplink feedback message is not transmitted). In some examples, the first uplink feedback message and the second uplink feedback message are both transmitted over the uplink feedback resource—e.g., using multiplexing. In some examples, the second uplink feedback message is transmitted over a second uplink feedback resource that occurs after the first uplink feedback message.

A first uplink grant associated with a HARQ process identifier is received at a first time, and a first uplink message is scheduled by the first uplink grant for a third time. After the first uplink grant is received and before the first uplink message is transmitted, a second uplink grant associated with the HARQ process identifier may be received, and a second uplink message associated with the HARQ process identifier may be scheduled after the first uplink message. After the uplink grants are received, the first uplink message may be transmitted.

Figure 2A:
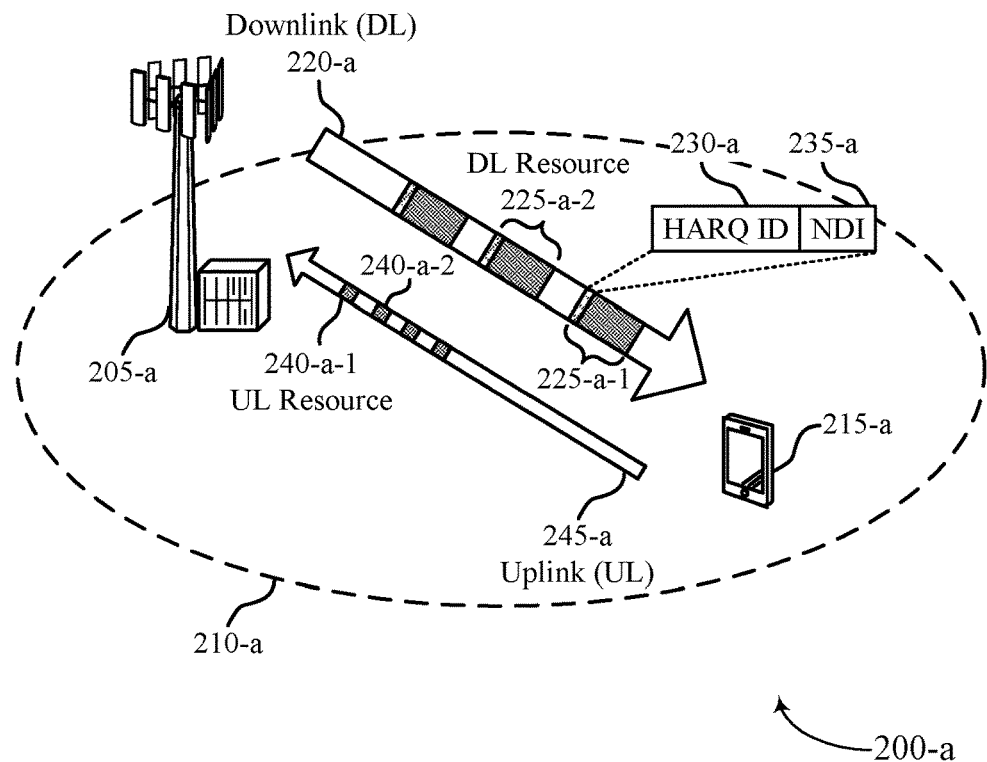
FIGS. 2A and 2B illustrates examples of wireless communications subsystems that support feedback process reuse in wireless communications in accordance with aspects of the present disclosure.

FIG. 2A illustrates an example of a wireless communications subsystem that supports feedback process reuse in wireless communications in accordance with aspects of the present disclosure.

Wireless communications subsystem 200-*a* may include base station 205-*a* and UE 215-*a*, which may be respective examples of a base station and a UE described in FIG. 1. Base station 205-*a* and UE 215-*a* may communicate within coverage area 210-*a* using one or more of the techniques described in FIG. 1. Base station 205-*a* may transmit information to UE 215-*a* via downlink 220-*a*. UE 215-*a* may transmit information to base station 205-*a* via uplink 245-*a*.

Base station 205-*a* may schedule downlink resources 225-*a* for transmitting control information and data to UE 215-*a*. Downlink resources 225-*a* may include control resources (e.g., PDCCH resources) for transmitting control information and data resources (e.g., PDSCH resources) for transmitting user data (e.g., application data)—e.g., in a transport block.

Base station 205-*a* may transmit downlink messages to UE 215-*a* using the downlink resources 225-*a*, where each downlink message may include control information and data. In some examples, the control information may include information about data that is also included in the downlink resource. For example, control information of a first downlink message transmitted using first downlink resource 225-*a*-1 may include HARQ process identifier 230-*a* and NDI 235-*a*. HARQ process identifier 230-*a* may indicate a HARQ process used to transmit the data of the first downlink message, and NDI 235-*a* may indicate whether the data is new (that is, transmitted for a first time) or repeated (e.g., retransmitted after a prior failure to communicate the data in a previous transmission).

UE 215-*a* may identify uplink resources 240-*a* based on downlink resources 225-*a* (and, in some examples, the downlink messages). In some examples, UE 215-*a* may identify the uplink resources 240-*a* based on a K1 timing parameter that indicates a duration (e.g., a minimum duration) between an end of a downlink resource 225-*a* and a beginning of an uplink resource 240-*a*. In some examples, UE 215-*a* identifies first uplink resource 240-*a*-1 based on first downlink resource 225-*a*-1. UE 215-*a* may transmit, using first uplink resource 240-*a*-1, acknowledgment feedback for data received in the first downlink message.

In some examples, base station 205-*a* may transmit a second downlink message using second downlink resource 225-*a*-2. A HARQ process identifier associated with the second downlink resource 225-*a*-2 may have the same value as HARQ process identifier 230-*a*, while a value of an NDI associated with the second downlink message may be different (e.g., flipped) relative to NDI 235-*a*. In some examples, second downlink resource 225-*a*-2 occurs before first uplink resource 240-*a*-1 in time—despite a same HARQ process identifier being used for the first downlink message and the second downlink message. In some examples, UE 215-*a* may discard the first downlink message after determining that the NDI transmitted using second downlink resources is flipped—thus, soft combining may not be used by UE 215-*a* to process the data communicated in the first downlink message.

By reusing the same HARQ process identifier before a feedback resource for a first downlink message associated with the HARQ process identifier occurs, a quantity of HARQ processes used to support communications between base station 205-*a* and UE 215-*a* may be reduced, while the communications between base station 205-*a* and UE 215-*a* may continuously (e.g., with gaps not exceeding a threshold duration) occupy the wireless spectrum. Continuously occupying the wireless spectrum may prevent other communication devices from gaining access to the wireless spectrum before scheduled communications between base station 205-*a* and UE 215-*a* can be completed.

In some examples, UE 215-*a* may identify second uplink resource 240-*a*-2 based on second downlink resource 225-*a*-2. In some examples, UE 215-*a* transmits, using second uplink resource 240-*a*-2, acknowledgment feedback for data received in the second downlink message. In other examples, UE 215-*a* transmits, using first uplink resource 240-*a*-1, acknowledgment feedback for data received in the second downlink message—e.g., in addition to transmitting acknowledgment feedback for data in the first downlink message. Techniques for processing downlink messages that reuse HARQ process identifiers before uplink feedback resources for an initial downlink message of the downlink messages occur are described in more detail herein and with reference to FIGS. 3A through 5B.

Figure 2B:
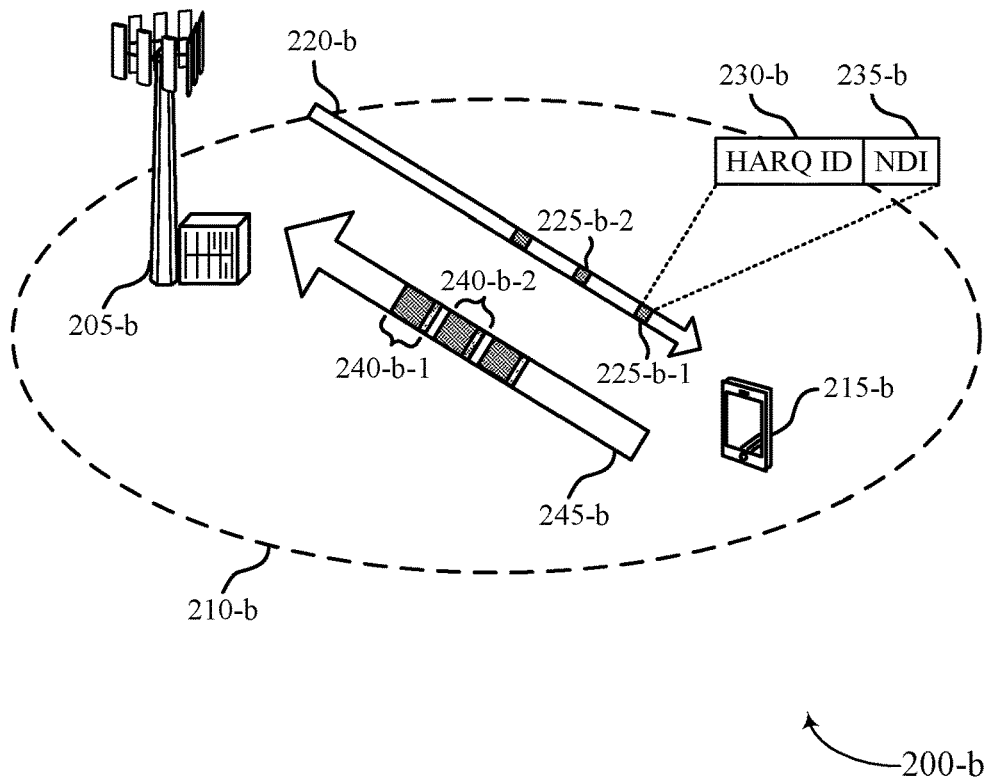

FIG. 2B illustrates an example of a wireless communications subsystem that supports feedback process reuse in wireless communications in accordance with aspects of the present disclosure.

Wireless communications subsystem 200-*b* may include base station 205-*b* and UE 215-*b*, which may be respective examples of a base station and a UE described in FIG. 1 or 2A. Base station 205-*b* and UE 215-*b* may communicate within coverage area 210-*b* using one or more of the techniques described in FIG. 1 or 2A. Base station 205-*b* may transmit information to UE 215-*b* via downlink 220-*b*. UE 215-*b* may transmit information to base station 205-*b* via uplink 245-*b*.

Base station 205-*b* may schedule downlink resources 225-*b* for transmitting control information to UE 215-*b*. Downlink resources 225-*b* may include control resources (e.g., PDCCH resources) for transmitting control information.

Base station 205-*b* may transmit uplink grants to UE 215-*b* using the downlink resources 225-*b*. In some examples, uplink grants include information about data that is to be transmitted in corresponding uplink messages scheduled by the uplink grants. For example, a first uplink grant transmitted using first downlink resource 225-*b*-1 may include HARQ process identifier 230-*b* and NDI 235-*b*. HARQ process identifier 230-*b* may indicate a HARQ process to use for transmitting data in a first uplink message scheduled by the first uplink grant, and NDI 235-*b* may indicate whether to transmit new data or repeated data in the first uplink message.

UE 215-*b* may identify uplink resources 240-*b* based on downlink resources 225-*b* and the uplink grants. In some examples, UE 215-*b* may identify the uplink resources 240-*b* based on a K2 timing parameter that indicates a duration (e.g., a minimum duration) between an end of a downlink resource and a beginning of an uplink resource. In some examples, UE 215-*b* identifies first uplink resource 240-*b*-1 based on the first uplink grant. UE 215-*b* may transmit, using first uplink resource 240-*b*-1, data to base station 205-*b* in the first uplink message based on the first uplink grant.

In some examples, base station 205-*b* may transmit a second uplink grant using second downlink resource 225-*b*-2. A HARQ process identifier included in the second uplink grant and associated with a second uplink message may have the same value as HARQ process identifier 230-*b*, while a value of an NDI included in the second uplink grant may be different (e.g., flipped) relative to NDI 235-*b*. In some examples, second downlink resource 225-*b*-2 occurs before first uplink resource 240-*b*-1 in time—despite a same HARQ process identifier being indicated in the first uplink grant and the second uplink grant. In some examples, based on determining that the NDI in the second uplink grant is flipped, UE 215-*b* may discard uplink data transmitted in the first uplink message after the first uplink message is transmitted—thus, soft combining may not be used by base station 205-*b* to process the data communicated in the first uplink message.

By reusing the same HARQ process identifier before an uplink resource for a first uplink message associated with the HARQ process identifier occurs, a quantity of HARQ processes used to support communications between base station 205-*b* and UE 215-*b* may be reduced, while the communications between base station 205-*b* and UE 215-*b* may continuously (e.g., with gaps not exceeding a threshold duration) occupy the wireless spectrum. Continuously occupying the wireless spectrum may prevent other communication devices from gaining access to the wireless spectrum before scheduled communications between base station 205-*a* and UE 215-*a* can be completed.

In some examples, UE 215-*b* may identify second uplink resources 240-*b*-2 based on an uplink grant received in second downlink resource 225-*b*-2. In some examples, UE 215-*b* transmits a second uplink message over second uplink resources 240-*b*-2. The second uplink message may include new data relative to the data transmitted in first uplink message. Techniques for processing uplink grants that reuse HARQ process identifiers before uplink resources scheduled by an initial uplink grant occur are described in more detail herein and with reference to FIGS. 6 and 7.

Figure 3:
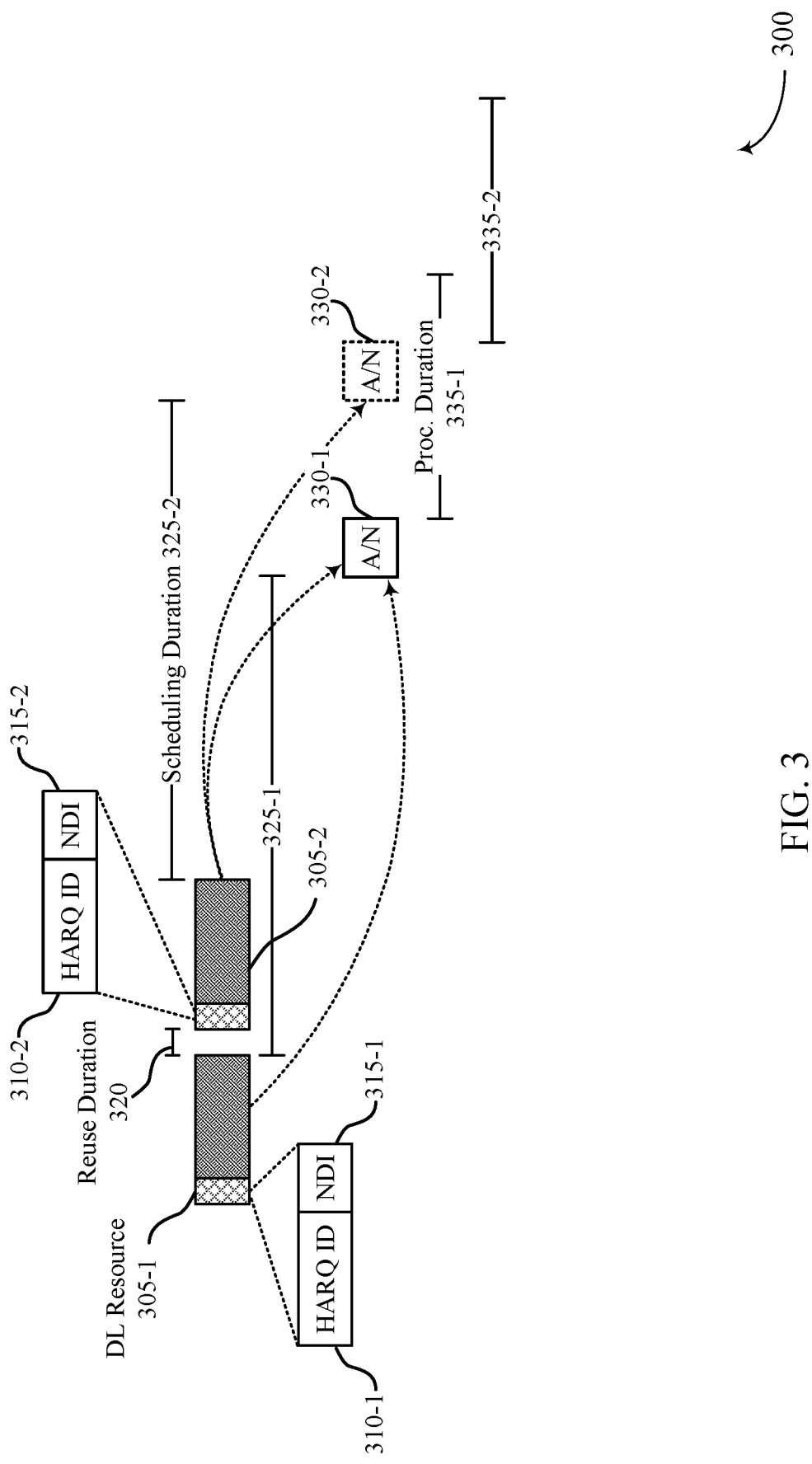
FIGS. 3 through 7 illustrate examples of resources diagrams for feedback process reuse in wireless communications in accordance with aspects of the present disclosure.

FIG. 3 illustrates an example of a resource diagram that supports feedback process reuse in wireless communications in accordance with aspects of the present disclosure.

Resource diagram 300 depicts downlink resources used to communicate downlink messages and uplink resources used to communicate acknowledgement feedback (e.g., HARQ A/Ns) for the downlink messages.

In some examples, a receiving device (e.g., a base station or UE) may receive, from a transmitting device (e.g., a base station or UE), a first downlink message using first downlink resource 305-1. The first downlink message may include control information (transmitted in a control portion of first downlink resource 305-1) and data (transmitted in a data portion of first downlink resource 305-1). In some examples, the data is included in a transport block. The control information may include first HARQ process identifier 310-1 and first NDI 315-1. First HARQ process identifier 310-1 may indicate a HARQ process (of multiple configured HARQ processes) associated with the data transmitted in the data portion of first downlink resource 305-1. First NDI 315-1 may indicate whether the data is new data or a retransmission of data.

The receiving device may identify first A/N resource 330-1 based on first downlink resource 305-1 and first scheduling duration 325-1. In some examples, first scheduling duration 325-1 between first downlink resource 305-1 and first A/N resource 330-1 is based on a K1 parameter—e.g., received in higher-layer signaling.

Before first A/N resource 330-1 occurs in time, the receiving device may receive a second downlink message using second downlink resource 305-2. Similar to the first downlink message, the second downlink message may include control information and data. In some examples, the data is transmitted in a second transport block. The control information may include second HARQ process identifier 310-2 and second NDI 315-2. Second HARQ process identifier 310-2 may have a same value as first HARQ process identifier 310-1, and thus may indicate that a same HARQ process is used for the first downlink message and the second downlink message. Second NDI 315-2 may be flipped relative to first NDI 315-1, and thus may indicate that the data transmitted in the second downlink message is different than (e.g., new relative to) the data transmitted in the first downlink message.

In some examples, second NDI 315-2 is the same as first NDI 315-1, and the receiving device determines that the second downlink message includes a retransmission of the data included in the first downlink message. The UE may use soft-combining techniques to combine the first downlink message with the second downlink message that increase a likelihood that the data communicated in the first downlink message and the second downlink message will be successfully decoded. In some examples, the transmitting device retransmits the data from the first downlink message if a likelihood that the first downlink message will fail exceeds a threshold.

In some examples, first downlink resource 305-1 may be separated from second downlink resource 305-2 by reuse duration 320. Reuse duration 320 may indicate a minimum duration between which transport blocks associated with a same HARQ process may be scheduled. In some examples, additional downlink resources that are associated with one or more other HARQ processes may be scheduled during reuse duration 320 (which may be smaller or larger than depicted in FIG. 3).

Similar to identifying first A/N resource 330-1, the receiving device may identify second A/N resource 330-2 based on second downlink resource 305-2 and second scheduling duration 325-2. Second scheduling duration 325-2 between second downlink resource 305-2 and second A/N resource 330-2 may also be based on the K1 parameter. In some examples, the receiving device may not identify second A/N resource 330-2 but instead may identify first A/N resource 330-1—e.g., second A/N resource 330-2 may not be scheduled for the receiving device. In some examples, the receiving device identifies the second A/N resource if a duration between an end of second downlink resources and a beginning of first downlink resources is shorter than a time for processing (e.g., decoding) the second downlink message.

In some examples, the receiving device transmits A/N feedback for the first downlink message in first A/N resource 330-1. The receiving device may also transmit A/N feedback for the second downlink message in first A/N resource 330-1—multiplexed with the A/N feedback for the first downlink message. In other examples, the receiving device may transmit A/N feedback for the second downlink message in second A/N resource 330-2. In some examples, the receiving device transmits A/N feedback for the second downlink message in first A/N resource 330-1 and does not transmit A/N feedback for the first downlink message in first A/N resource 330-1—e.g., if a type 3 codebook for reporting acknowledgement feedback for a latest downlink message associated with a HARQ process is received. In other examples, the receiving device transmits multi-bit A/N feedback for the first downlink message and the second downlink message in first A/N resource 330-1, where a first bit of the multi-bit A/N feedback may indicate acknowledgment feedback for the first downlink message and a second bit of the multi-bit A/N feedback may indicate acknowledgment feedback for the second downlink message—e.g., if a type 3 codebook that includes multi-bit A/N feedback is used.

In some examples, the receiving device may generate an A/N codebook based on receiving the first downlink message and the second downlink message. In some examples, the acknowledgment information for the first downlink message is included in an entry in the A/N codebook that precedes an entry in the A/N codebook for the second downlink message. The receiving device may transmit the A/N codebook using first A/N resource 330-1.

Based on receiving the acknowledgment feedback, the transmitting device may process the acknowledgement feedback to determine which downlink messages were successfully received. First processing duration 335-1 may indicate a duration for the transmitting device to process the acknowledgment feedback and generate subsequent transmissions/retransmissions.

In some examples, the transmitting device may determine that the first downlink message, the second downlink message, or both, were unsuccessfully received by the receiving device. In such cases, the transmitting device may retransmit the data included in the failed downlink messages using downlink resources that occur after first A/N resource 330-1. In some examples, the transmitting device may assume that the first downlink message was received by the receiving device—e.g., if acknowledgment feedback for solely the second downlink message is received. In such cases, RLC retransmission techniques may be used to retransmit the data in the first downlink message if the first downlink message failed.

Figure 4:
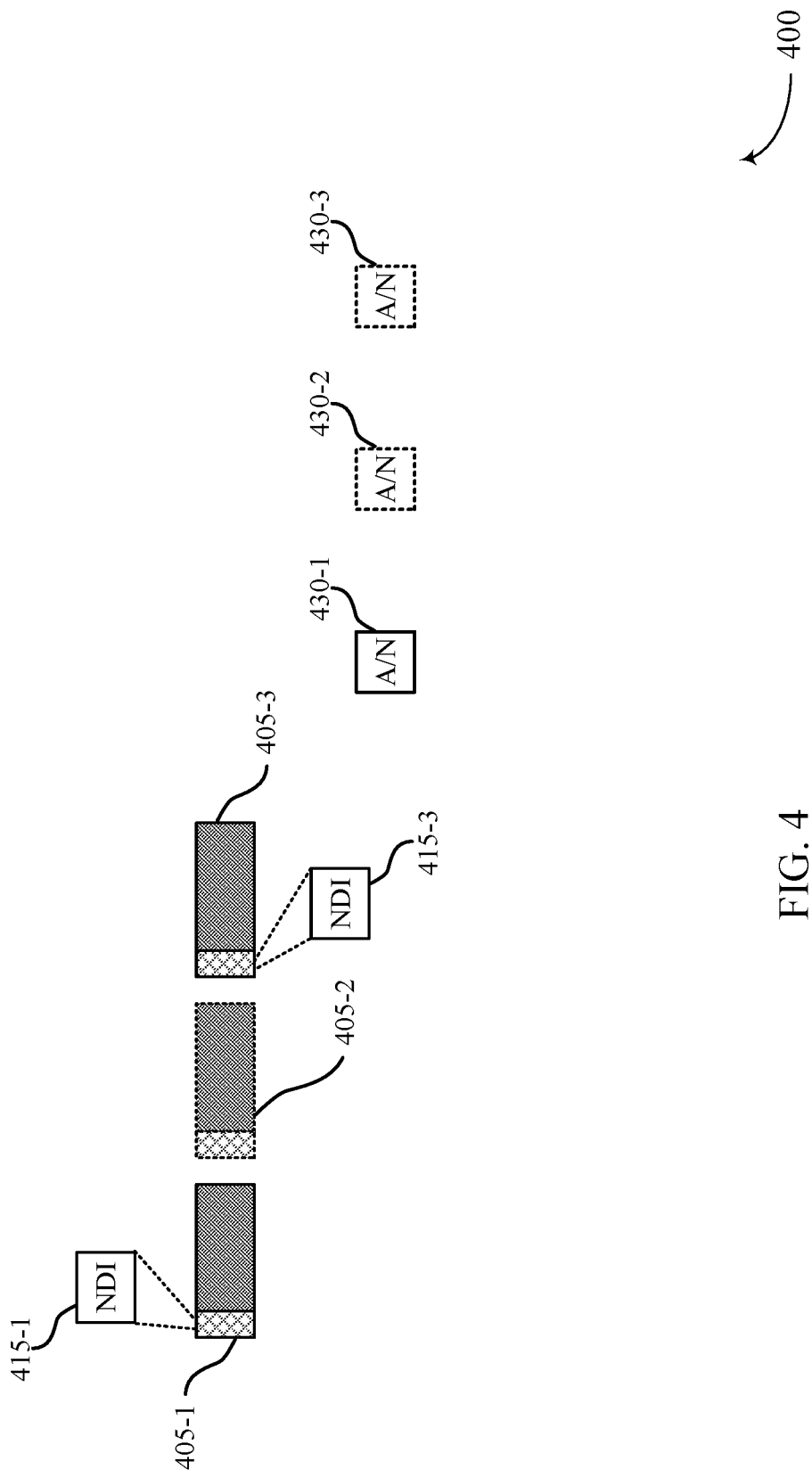

FIG. 4 illustrates an example of a resource diagram that supports feedback process reuse in wireless communications in accordance with aspects of the present disclosure.

Resource diagram 400 may be similarly configured as resource diagram 300 of FIG. 3. Relative to FIG. 3, resource diagram 400 may depict an example where a downlink message is missed by the receiving device—e.g., a second downlink message transmitted using second downlink resource 405-2. In such cases, third NDI 415-3 receiving in a third downlink message may have a same value as first NDI 415-1 received in a first downlink message, despite new data being transmitted in the third downlink message. The receiving device may be configured to determine that an intervening downlink message was transmitted during an intervening downlink resource (e.g., second downlink resource 405-2) and missed (e.g., not detected) by the receiving device when NDIs having a same value are received.

After determining that an intervening downlink message went undetected, the receiving device may generate acknowledgement feedback for the intervening downlink message indicating that the intervening downlink message was missed (e.g., a NACK or DTX feedback). In some examples, the receiving device transmits a negative acknowledgment using uplink feedback resources associated with the intervening downlink message. In other examples, the receiving device transmits nothing during uplink feedback resources associated with the intervening downlink message.

In some examples, the receiving device transmits the acknowledgment feedback for the downlink messages in respective A/N resources 430. In other examples, the receiving device transmits the acknowledgment feedback for the downlink messages in a single uplink resource (e.g., first A/N resource 430-1).

Figure 5A:
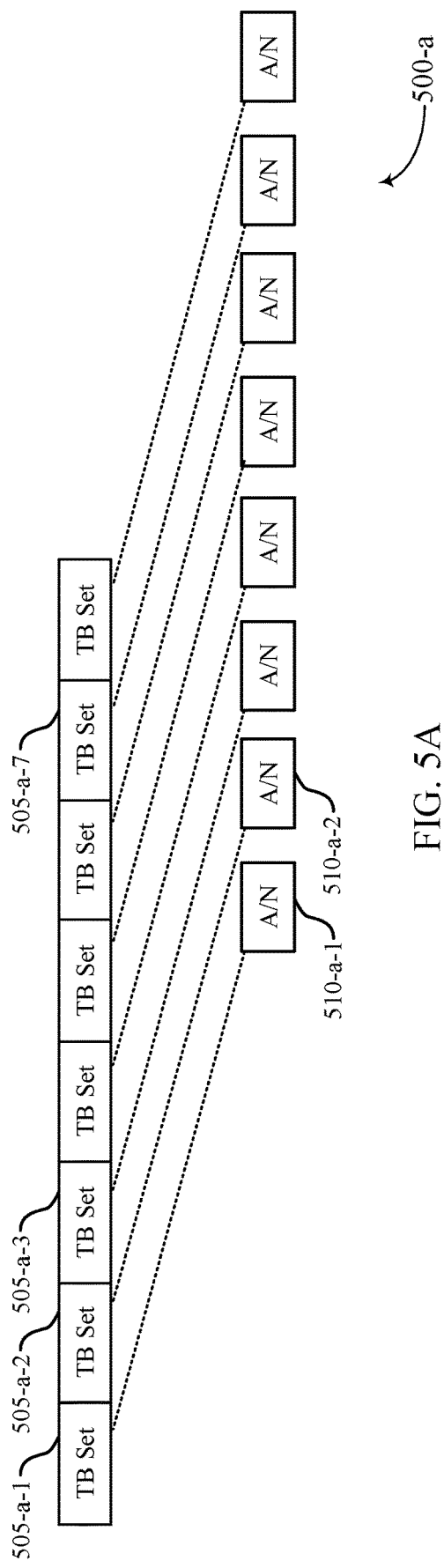

FIG. 5A illustrates an example of a resource diagram that supports feedback process reuse in wireless communications in accordance with aspects of the present disclosure.

Resource diagram 500-a depicts sets of downlink resources used to communicate downlink messages and uplink resources used to communicate acknowledgement feedback for the downlink message. Each set of downlink resources may include multiple downlink messages that are each associated with a respective HARQ process of a set of HARQ processes configured to support communications between communication devices. Each downlink message may include a transport block that includes data for a receiving device. In some examples, the quantity of HARQ processes included in a set of HARQ processes is based on a minimum duration for reusing a HARQ process. By using sets of HARQ processes, wireless spectrum allocated to the transmitting device for downlink transmissions may remain occupied during a period that is allocated for communications between the communication devices.

In some examples, first TB set 505-a-1 is associated with a set of HARQ processes identified by HARQ process identifiers 0 through 10. The additional TB sets 505-a may be associated with the same set of HARQ processes.

In some examples, the receiving device receives first TB set 505-a-1, which may include a set of transport blocks that are each associated with a respective HARQ process of the set of HARQ processes (e.g., the transport block transmitted in first downlink resource 305-1 of FIG. 3). The receiving device may transmit acknowledgment feedback for first TB set 505-a-1 during first A/N resource 510-a-1. In some examples, the acknowledgment feedback is transmitted in a same order in which the transport blocks of first TB set 505-a-1 are received. In some examples, the receiving device generates a codebook that includes A/N indicators for the transport blocks included in first TB set 505-a-1. The entries of the codebook may correspond to the transport blocks such that an initial entry of the codebook may correspond to the initial transport block of first TB set 505-a-1, the second entry of the codebook may correspond to the second transport block of first TB set 505-a-1, and so on. In some examples, the codebook is a type 3 codebook, and the entries of the codebook may correspond to the HARQ processes such that an initial entry of the codebook may correspond to the first HARQ process identifier, a second entry of the codebook may correspond to the second HARQ process identifier, and so on.

Before first A/N resource 510-a-1 occurs, the receiving device may receive second TB set 505-a-2, which may include a second set of transport blocks that are each associated with the same set of HARQ processes as first TB set 505-a-2 (e.g., the transport block transmitted in second downlink resource 305-2 of FIG. 3). Also, NDIs associated with second TB set 505-a-2 may be flipped relative to NDIs associated with first TB set 505-a-1. The receiving device may transmit acknowledgment feedback for the second TB set 505-a-2 during second A/N resource 510-a-2. The receiving device may similarly receive third TB set 505-a-3 before first A/N resource 510-a-1 occurs.

In some examples, in acknowledgement feedback transmitted using first A/N resource 510-a-1, the receiving device transmits one or more negative acknowledgments for one or more transport blocks associated with first TB set 505-a-1. In some examples, the transmitting device retransmits, to the receiving device, the data from the one or more failed transport blocks using in one or more transport blocks that occur after first A/N resource 510-a-1 (e.g., in transport blocks of seventh TB set 505-a-7) using the same or different HARQ processes as the one or more failed downlink messages.

Figure 5B:
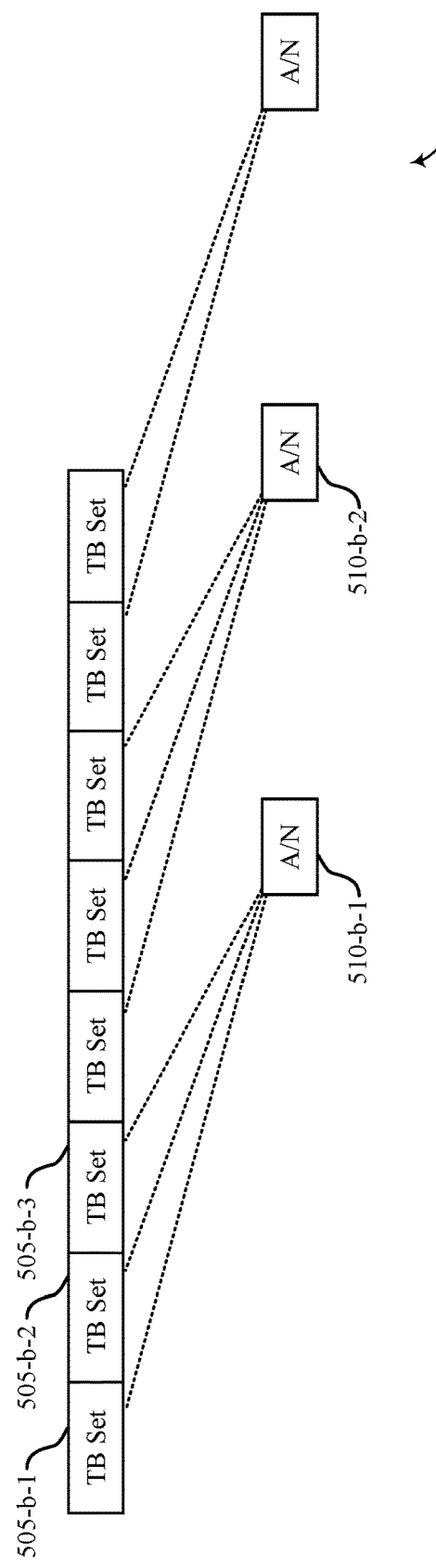

FIG. 5B illustrates an example of a resource diagram that supports feedback process reuse in wireless communications in accordance with aspects of the present disclosure.

Resource diagram 500-b may be similarly configured as resource diagram 500-a of FIG. 5A. Relative to FIG. 5A, resource diagram 500-b may depict an example where HARQ feedback is communicated for multiple TB sets 505-b in single A/N resources. In some examples, the acknowledgment feedback communicated in first A/N resource 510-b-1 is transmitted in a same order in which the transport blocks of first TB set 505-b-1, second TB set 505-b-1, and third TB set 505-b-3 are received.

In some examples, the receiving device generates a codebook that includes A/N indicators for the transport blocks included in first TB set 505-b-1, second TB set 505-b-2, and third TB set 505-b-1. The entries of the codebook may correspond to the transport blocks such that an initial entry of the codebook may correspond to the initial transport block of first TB set 505-b-1, the second entry of the codebook may correspond to the second transport block of second TB set 505-b-2, and so on until an Mth entry of the codebook corresponds to the initial transport block of second TB set 505-b-2, an (M+1)th entry of the codebook corresponds to the second transport block of second TB set 505-b-2, and so on until an Nth entry of the codebook corresponds to the initial transport block of third TB set 505-b-3, and so on.

In some examples, the codebook is a Type 3 codebook, and the entries of the codebook may correspond to the HARQ processes such that an initial entry of the codebook may correspond to the first HARQ process identifier, a second entry of the codebook may correspond to the second HARQ process identifier, and so on. In some examples, the entries of the Type 3 codebook correspond to the latest TB set associated with a current A/N resource—e.g., for first A/N resource 510-*b*-1, the initial entry of a codebook corresponds to the first transport block of the third TB set 505-*b*-3, the second entry of the codebook corresponds to the second transport block of the third TB set 505-*b*-3, and so on.

In other examples, the entries of the Type 3 codebook include multiple bits and correspond to each of the TB sets associated with a current A/N resource—e.g., for first A/N resource 510-*b*-1, a first bit of an initial entry of a codebook corresponds to the initial transport block of the first TB set 505-*b*-1, a second bit of the initial entry of a codebook corresponds to the initial transport block of the second TB set 505-*b*-2, a third bit of the initial entry of the codebook corresponds to the initial transport block of the third TB set 505-*b*-3, a first bit of a second entry of the codebook corresponds to the second transport block of the first TB set 505-*b*-1, and so on.

Figure 6:
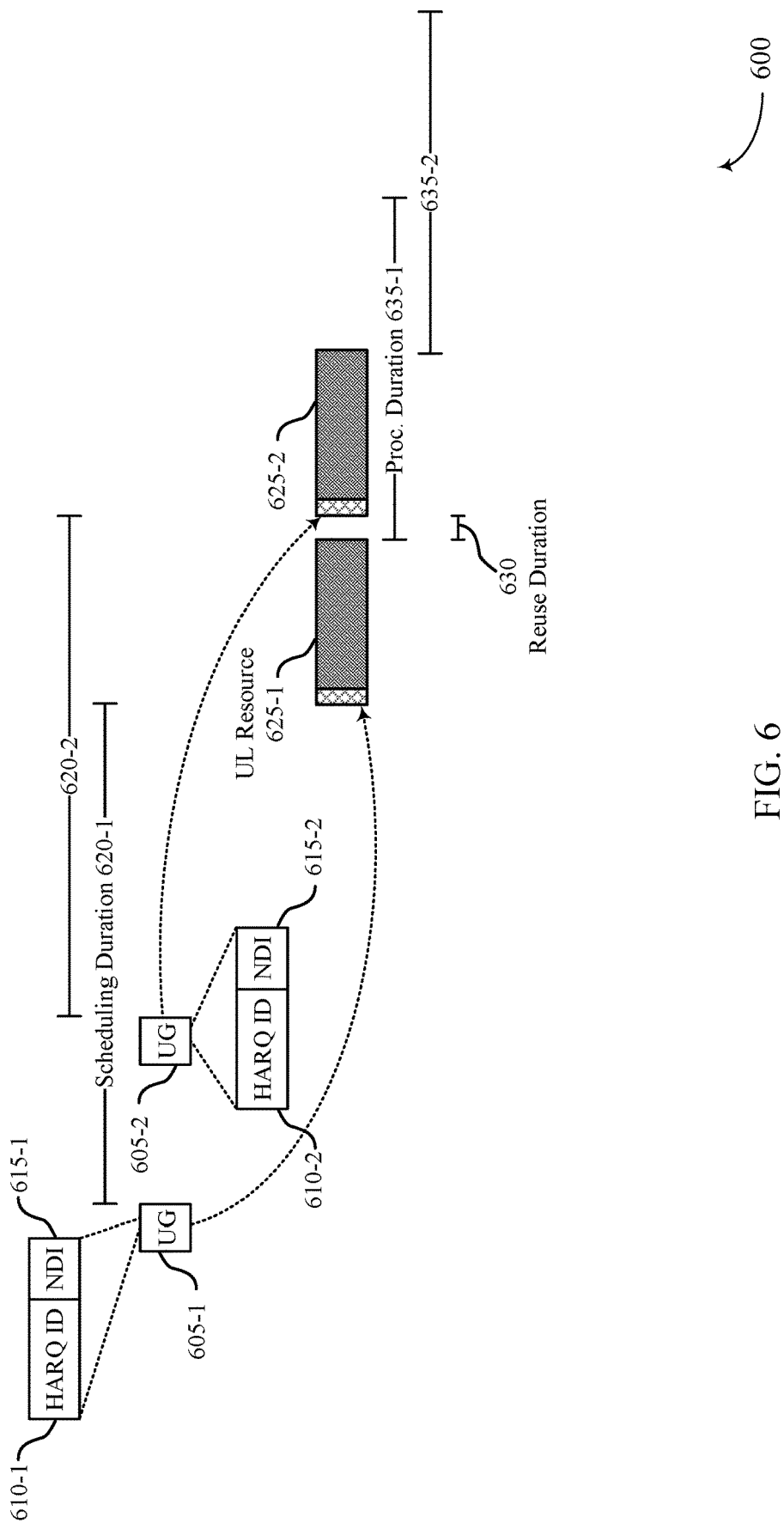

FIG. 6 illustrates an example of a resource diagram that supports feedback process reuse in wireless communications in accordance with aspects of the present disclosure.

Resource diagram 600 depicts downlink resources used to schedule uplink resources that are used to communicate uplink messages.

In some examples, a receiving device (e.g., a UE or base station) may receive, from a scheduling device (e.g., a base station or UE) a first uplink grant (UG) using first UG resource 605-1. The first uplink grant may schedule a first uplink message over first uplink resource 625-1. The first uplink grant may include first HARQ process identifier 610-1 and first NDI 615-1. First HARQ process identifier 610-1 may indicate a HARQ process (of multiple configured HARQ processes) associated with data transmitted in an uplink message scheduled by the uplink grant for first uplink resource 625-1. First NDI 615-1 may indicate whether the uplink message is to include new data or retransmitted data. The first uplink grant may also indicate a time and/or frequency location of first uplink resource 625-1. In some examples, first uplink resource 625-1 (and first uplink message) may include a control portion and a data portion. In other examples, first uplink resource 625-1 (and first uplink message) may include solely a data portion.

The receiving device may identify first uplink resource 625-1 based on first UG resource 605-1 and first scheduling duration 620-1. In some examples, first scheduling duration 620-1 between first UG resource 605-1 and first uplink resource 625-1 is based on a K2 parameter—e.g., received in higher-layer signaling.

Before first uplink resource 625-1 occurs in time, the receiving device may receive, using second UG resource 605-2, a second uplink grant that schedules a second uplink message for second uplink resource 625-2. The second uplink grant may include second HARQ process identifier 610-2 and second NDI 615-2. Second HARQ process identifier 610-2 may have a same value as first HARQ process identifier 610-1, and thus may indicate that a same HARQ process is to be used for the second uplink message as the first uplink message. Second NDI 615-2 may be flipped relative to first NDI 615-1, and thus may indicate that the data to be transmitted in the second uplink message will be different (e.g., new) relative to the data transmitted in the first uplink message. Thus, the receiving device may determine that the first uplink message was successfully received (despite the first uplink message not yet being transmitted). In such cases, RLC retransmission techniques may be used to trigger the retransmission of uplink data for failed uplink messages. In some examples, second uplink resource 625-2 (and second uplink message) may include a control portion and a data portion. In other examples, second uplink resource 625-2 (and second uplink message) may include solely a data portion.

The receiving device may identify second uplink resource 625-2 based on second UG resource 605-2 and second scheduling duration 620-2. In some examples, second scheduling duration 620-2 between second UG resource 605-2 and second uplink resource 625-2 is based on the K2 parameter. In some examples, first uplink resource 625-1 may be separated from second uplink resource 625-2 by reuse duration 630. Reuse duration 630 may indicate a minimum duration between which transport blocks associated with a same HARQ process may be scheduled. In some examples, additional uplink resources that are associated with one or more other HARQ processes may be scheduled during reuse duration 630 (which may be smaller or larger than depicted in FIG. 6).

The receiving device may transmit data in the first uplink message in first uplink resource 625-1 based on receiving the first uplink grant. Based on receiving the first uplink message, the scheduling device may process the data included in the first uplink message. First processing duration 635-1 may indicate a duration for the scheduling device to process the uplink message—e.g., decode the data in the uplink message. In some examples, the scheduling device determines that the data in the first uplink message is corrupted but is unable to reschedule a transmission of the message based on indicating that the first uplink message was successfully received in the second uplink grant. In such cases, RLC retransmission techniques may be used to trigger the retransmission of the data included in the failed uplink message. For example, the scheduling device may transmit an RLC Status PDU to the receiving device that indicates that an RLC PDU associated with the failed uplink message has not been received. Accordingly, the receiving device may retransmit the RLC PDU in a subsequent uplink message scheduled by a subsequent uplink grant in a new data transmission.

The receiving device may also transmit data in the second uplink message using second uplink resource 625-2 based on the second uplink grant. The data included in the second uplink message may be different (e.g., new) relative to the data included in the first uplink message—e.g., based on second NDI 615-2 being flipped relative to first NDI 615-1. In some examples, the receiving device may be configured to determine an uplink message including new data has been scheduled regardless of whether the NDIs of consecutive uplink grants are the same. In such cases, the receiving device may determine that an intervening uplink grant between uplink grants having the same NDI values was missed.

Figure 7:
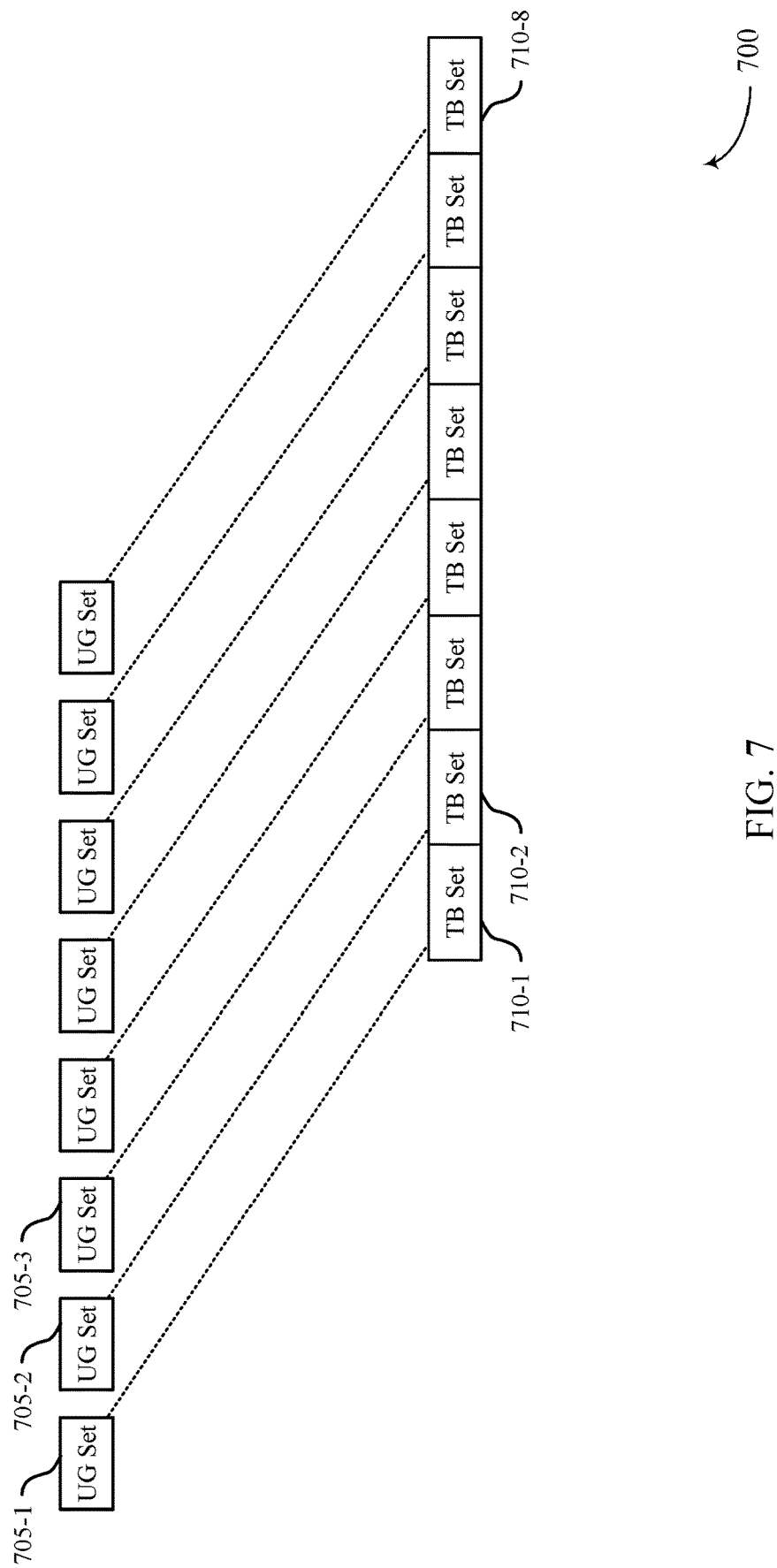

FIG. 7 illustrates an example of a resource diagram that supports feedback process reuse in wireless communications in accordance with aspects of the present disclosure.

Resource diagram 700 depicts downlink resources used to schedule sets of uplink resources used to communicate uplink messages. Each downlink resource may include multiple uplink grants that are each associated with a respective HARQ process of a set of HARQ processes configured to support communications between the communication devices. Also, each uplink resource may include multiple uplink messages that are each scheduled by a respective uplink grant and associated with a respective HARQ process. In some examples, the quantity of HARQ processes included in a set of HARQ processes is based on a minimum duration for reusing a HARQ process. By using sets of HARQ processes, wireless spectrum allocated to the receiving device for uplink transmissions may remain occupied during a period that is allocated for communications between the communication devices.

In some examples, first UG set 705-1 may include a set of uplink grants associated with a set of HARQ processes identified by HARQ process identifiers 0 through 10. The additional UG sets 705 may be associated with the same set of HARQ processes.

In some examples, the receiving device receives the first set of uplink grants in first UG set 705-1 and identifies first uplink resources scheduled for transmitting first TB set 710-1 based on the first set of uplink grants. First TB set 710-1 may include a set of transport blocks associated with the set of HARQ processes, where each transport block may correspond to a respective uplink grant of first UG set 705-1.

Before the first uplink resources occur, the receiving device may also receive a second set of uplink grants in second UG set 705-2. The second UG set 705-2 may include a second set of uplink grants associated with the same set of HARQ processes as first UG set 705-1. Also, NDIs indicated by second UG set 705-2 may be different than (e.g., flipped relative to) NDIs indicated by first UG set 705-1. The receiving device may identify second uplink resources scheduled for transmitting second TB set 710-2 based on the uplink grants included in second UG set 705-2. Second TB set 710-2 may be associated with the same set of HARQ processes as first TB set 710-1. The receiving device may similarly receive third UG set 705-3 before the first uplink resources occur and fourth UG set 705-4.

The receiving device may transmit first TB set 710-1 using the first set of uplink resources. In some examples, each transport block of first TB set 710-1 may include new data. The receiving device may also transmit second TB set 710-2 using the second set of uplink resources, where each transport block of second TB set 710-1 may include new data— e.g., based on the different NDIs. In some examples, the receiving device removes the transmitted data from a transmission buffer after transmitting the data—e.g., based on the assumption that the transmitted data will be successfully received.

In some examples, the uplink data is not successfully received at the scheduling device. In such cases, RLC retransmission techniques may be used to trigger the retransmission of the data. In some examples, the scheduling device transmits an RLC Status PDU to the receiving device indicating the RLC PDUs that have been successfully received at the scheduling device. The receiving device may retransmit, to the scheduling device, the data associated with any RLC PDUs that were unsuccessfully received—e.g., in eighth TB set 710-8 in a new data transmission. In some examples, the data may be retained in an RLC buffer until all of the RLC PDUs of a set of RLC PDUs including the data have been acknowledged.

Figure 8:
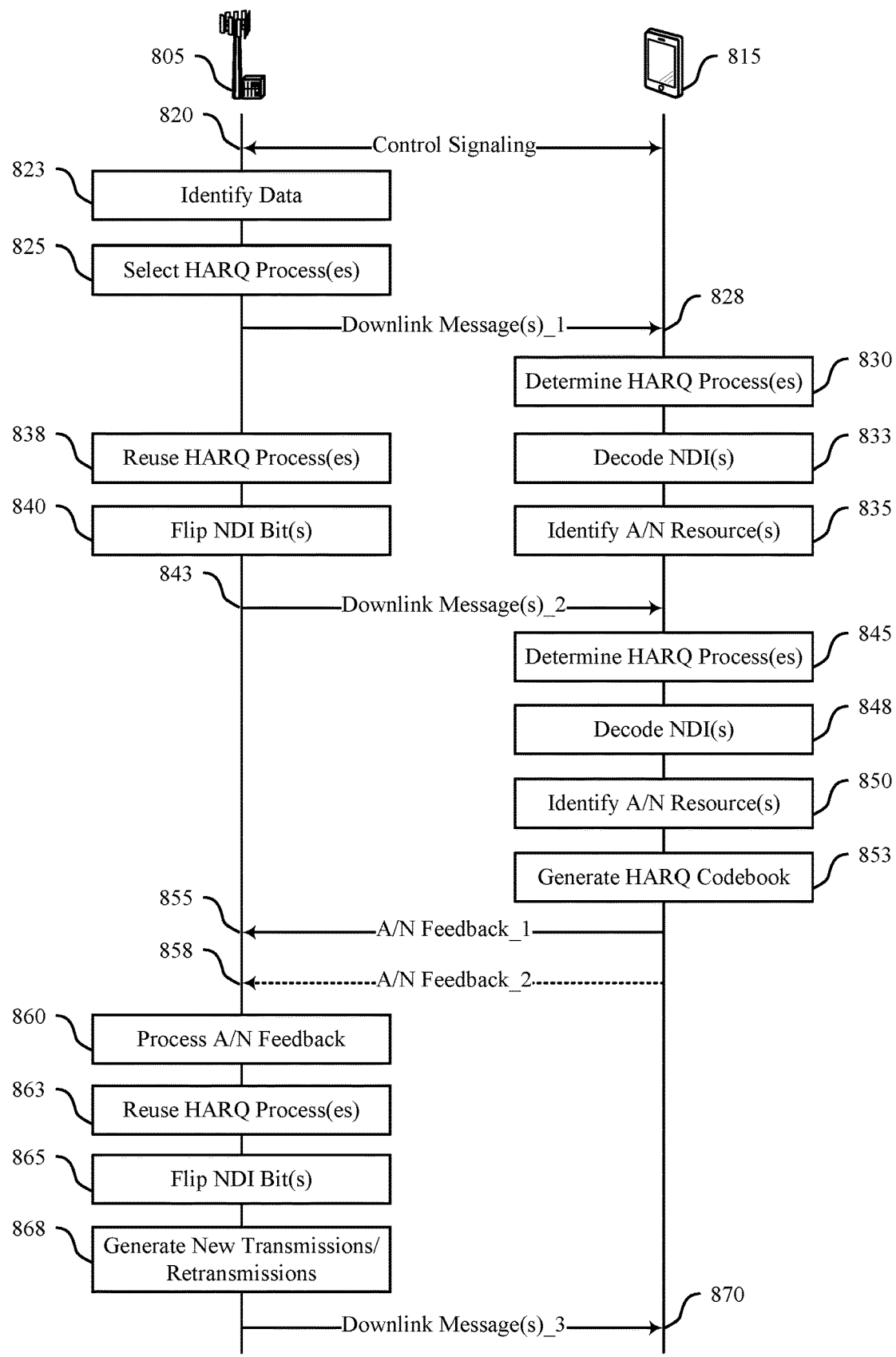
FIGS. 8 and 9 illustrates examples of sets of operations for feedback process reuse in wireless communications in accordance with aspects of the present disclosure.

FIG. 8 illustrates an example of a set of operations that supports feedback process reuse in wireless communications in accordance with aspects of the present disclosure.

Process flow 800 may be performed by base station 805 and UE 815, which may be respective examples of a base station or UE described herein and with reference to FIGS. 1 and 2. In some examples, process flow 800 illustrates an exemplary sequence of operations performed to support feedback process reusing in wireless communication. For example, process flow 800 depicts operations for transmitting, to another device, multiple downlink message that use a same set of HARQ processes before an A/N resource for an initial downlink message of the multiple downlink message occurs.

It is understood that one or more of the operations described in process flow 800 may be performed earlier or later in the process, omitted, replaced, supplemented, or combined with another operation. Also, additional operations described herein that are not included in process flow 800 may be included.

At arrow 820, base station 805 and UE 815 may exchange control signaling. In some examples, base station 805 sends signaling that configures multiple HARQ processes to support communications between base station 805 and UE 815. In some examples, base station 805 indicates to UE 815 that HARQ processes may be reused for downlink messages before an acknowledgment resource scheduled for an initial downlink message occurs. In some examples, base station 805 may direct UE 815 to disable a soft-combining capability and to assume that multiple downlink messages (or uplink messages) associated with a same HARQ process include new data transmissions.

Base station 805 may also indicate to UE 815 a type of codebook reporting to use. For example, base station 805 may send signaling that enables Type 1 or Type 2 codebook reporting at UE 815. Or base station 805 may send signaling that enables Type 3 codebook reporting at UE 815. When Type 3 codebook reporting is enabled, base station 805 may also indicate whether (1) A/N feedback for the latest downlink message associated with a HARQ process or (2) multi-bit A/N feedback for a set of downlink messages associated with a HARQ process is to be reported.

At block 823, base station 805 may identify data for transmission to UE 815.

At block 825, base station 805 may select a set of HARQ processes to communicate the data to UE 815. In some examples, a quantity of HARQ processes included in the set of HARQ processes is based on a minimum duration for reusing HARQ processes.

At arrow 828, base station 805 may transmit first downlink messages to UE 815 using the set of HARQ processes (e.g., HARQ process 0 to 10). Each downlink message may include a control portion and a data portion, where the control portion may indicate a HARQ process identifier associated with the data portion. The control portion may also include an NDI that indicates whether the data included in the data portion is new or retransmitted.

At block 830, UE 815 may determine the HARQ processes used to transmit the first downlink messages—e.g., based on the control portion of the first downlink messages. In some examples, UE 815 may determine a respective HARQ process for each of the first downlink messages.

At block 835, UE 815 may decode the NDIs in the first downlink messages to determine whether new or retransmitted data is included in the data portion of the first downlink messages. In some examples, UE 815 determines that a downlink message includes new data if the NDI of the downlink message is different than (e.g., flipped relative to) the NDI of a preceding downlink message received at UE 815 and associated with the same HARQ process. In other examples, UE 815 may determine that the downlink message includes new data regardless of whether the NDI of the downlink message is different than the NDI of the preceding downlink message. In such cases, UE 815 may determine that a failure to receive an intervening downlink message transmitted between the downlink messages occurred.

At block 835, UE 815 may identify first A/N resources for communicating acknowledgement information for the first downlink messages—e.g., based on a K1 parameter value.

At block 838, base station 805 may reuse the HARQ processes used for the first downlink messages to communicate second downlink messages.

At block 840, base station 805 may update (e.g., flip) NDIs associated with the HARQ processes—e.g., to indicate that new data is to be transmitted in the second downlink messages.

At arrow 843, base station 805 may transmit the second downlink messages to UE 815 using the set of HARQ processes and the updated NDI values.

At block 845, UE 815 may determine the HARQ processes used to transmit the second downlink messages. In some examples, UE 815 may determine a respective HARQ process for each of the second downlink messages.

At block 848, UE 815 may decode the NDIs in the second downlink messages to determine whether new or retransmitted data is included in the data portion of the second downlink messages. In some examples, UE 815 compares the NDIs of the second downlink messages with respective NDIs of the first downlink messages (e.g., NDIs that are associated with a same HARQ process) to determine whether the second downlink messages include new data. In some examples, UE 815 may determine that downlink messages of the second downlink messages include new data if the NDIs of the downlink messages are different than the NDIs of corresponding downlink messages of the first downlink messages.

In other examples, UE 815 may determine that downlink messages of the second downlink messages include new data regardless of whether the NDIs of the downlink messages are different than the NDIs of corresponding downlink messages of the first downlink messages. In such cases, UE 815 may determine that an intervening downlink message was missed between consecutive downlink messages that have the same NDI values and are associated with a same HARQ process.

At block 850, UE 815 may identify A/N resources for communicating acknowledgement information for the second downlink messages. In some examples, the A/N resources are the same as the A/N resources used to communicate acknowledgment information for the first downlink messages. In such cases, the acknowledgment information for the first downlink messages may be multiplexed with the acknowledgment information for the second downlink messages. In other examples, the A/N resources are different than as the A/N resources used to communicate acknowledgment information for the first downlink messages—e.g., the A/N resources for the second downlink messages may occur later in time and be based on the K1 parameter value.

At block 853, UE 815 may generate a codebook for reporting acknowledgement information for the first downlink messages (and, in some examples, the second downlink messages). In some examples, the codebook is a Type 1 (semi-static) or Type 2 (dynamic) codebook, and the acknowledgment information for the downlink messages is organized based on an order in which the first downlink messages are received—e.g., within a component carrier, acknowledgment information for a set of downlink messages is organized in a same order as the order in which the set of downlink messages are received. In some examples, the codebook is a Type 3 (one-shot) codebook, and the acknowledgement information is organized based on an order of the HARQ process. In some examples, when Type 3 codebook reporting is configured, UE 815 may report acknowledgment information solely for the second downlink messages. In other examples, when Type 3 codebook reporting is configured, UE 815 may report acknowledgment information for the first downlink messages and the second downlink messages using multi-bit A/N indicators.

At arrow 855, UE 815 may transmit acknowledgement feedback using the A/N resources identified for the first downlink messages. In some examples, transmitting the acknowledgment feedback includes transmitting the generated codebook using the A/N resources identified for the first downlink messages. The acknowledgment feedback may include A/N indicators for the first downlink messages. In some examples, the acknowledgment feedback may also include A/N indicators for the second downlink messages, where the A/N indicators for the second downlink messages may be multiplexed with the A/N indicators for the first downlink messages. In both cases, the acknowledgment information transmitted by UE 815 may be arranged in an order that corresponds to an order in which the downlink messages were received.

In some examples, the acknowledgment feedback includes acknowledgement information for intervening downlink messages that were transmitted between first downlink messages and second downlink messages but missed by UE 815—e.g., if UE 815 determines that an NDI of a downlink message of the first downlink messages and associated with a HARQ process is different than an NDI of a downlink message of the second downlink messages and associated with the same HARQ process.

At arrow 858, UE 815 may transmit acknowledgment feedback for the second downlink messages—e.g., if the acknowledgment feedback for the first downlink messages is not configured (e.g., scheduled) to be multiplexed with the acknowledgment feedback for the second downlink messages.

At block 860, base station 805 may process the acknowledgment feedback. In some examples, base station 805 may determine that one or more downlink messages were not successfully received at UE 815.

At block 863, base station 805 may reuse the same set of HARQ processes.

At block 865, base station 805 may flip the NDI bits associated with the set of HARQ processes.

At block 868, base station 805 may generate a third set of downlink messages. In some examples, the third set of downlink messages may include new data and data that was previously transmitted in a failed downlink message. In some examples, the retransmitted data may be included in a downlink message associated with a same HARQ process as the previous downlink message used to transmit the data. In other examples, the retransmitted data may be included in a downlink message associated with a different HARQ process as the previous downlink message used to transmit the data. In both cases, the retransmitted data may be processed as new data at UE 815—e.g., based on the NDI of the downlink message used to transmit the retransmitted data.

At arrow 870, base station 805 may transmit the third downlink messages to UE 815 using the set of HARQ processes.

In some examples, RLC retransmission techniques may be used to retransmit data that was previously transmitted in a failed downlink message. For example, if UE 815 does not report A/N feedback for the failed downlink message—e.g., if Type 3 codebook reporting that reports the latest A/N feedback for the latest downlink message associated with a HARQ process is used. In such cases, UE 815 may transmit an RLC Status PDU to base station 805 indicating which RLC PDUs in an RLC window have been successfully received. Base station 805 may determine that an RLC PDU associated with the failed data has not been successfully received based on the RLC Status PDU. Thus, base station 805 may retransmit the data associated with the RLC PDU in subsequent downlink messages—which may appear to UE 815 as new data transmissions.

Figure 9:
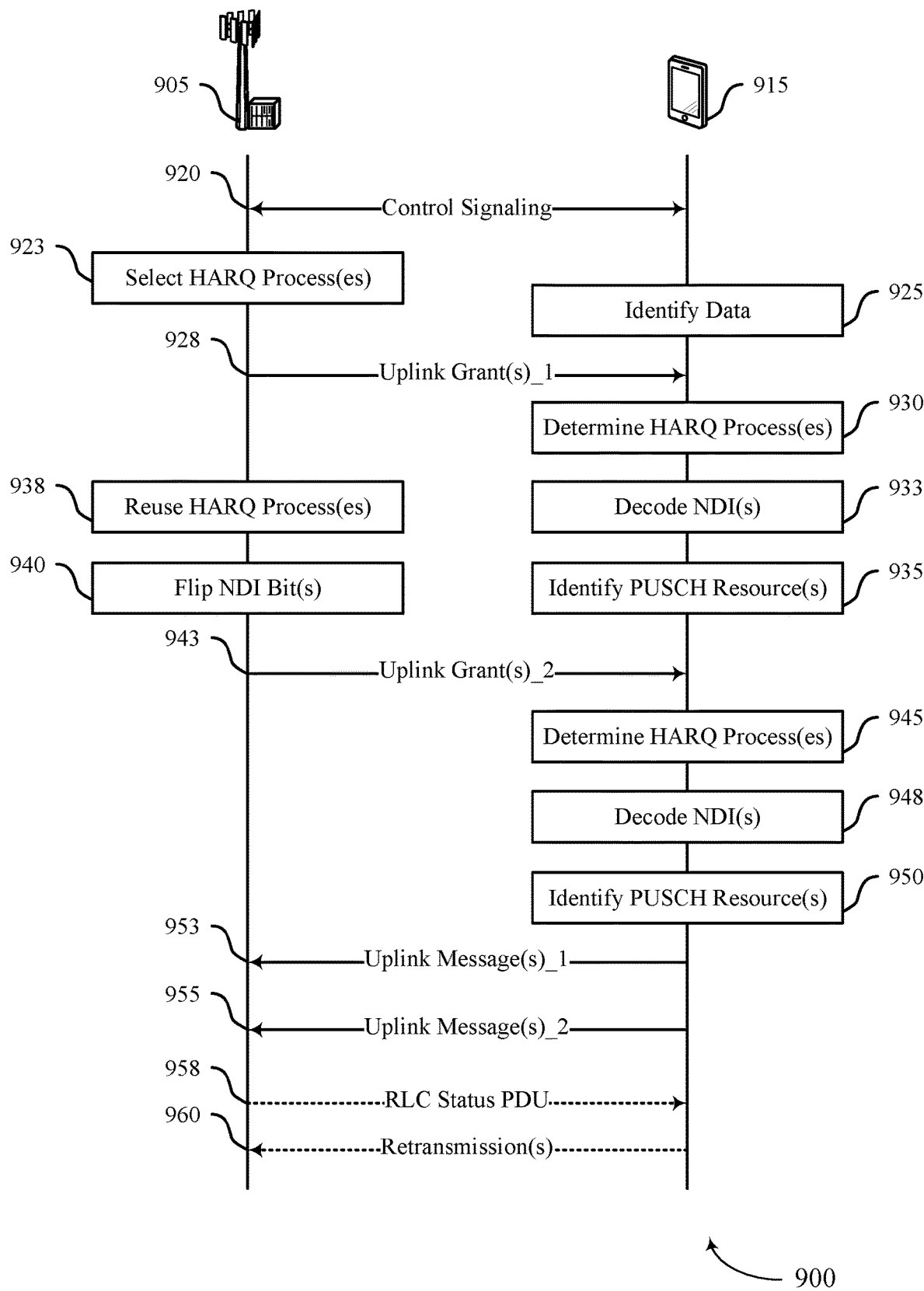

FIG. 9 illustrates an example of a set of operations that supports feedback process reuse in wireless communications in accordance with aspects of the present disclosure.

Process flow 900 may be performed by base station 905 and UE 915, which may be respective examples of a base station or UE described herein and with reference to FIGS. 1, 2, and 8. In some examples, process flow 900 illustrates an exemplary sequence of operations performed to support feedback process reusing in wireless communication. For example, process flow 900 depicts operations for transmitting, to another device, multiple uplink grants that use a same set of HARQ processes before an uplink resource for an initial uplink message scheduled by an initial uplink grant of the multiple uplink grants occurs.

It is understood that one or more of the operations described in process flow 900 may be performed earlier or later in the process, omitted, replaced, supplemented, or combined with another operation. Also, additional operations described herein that are not included in process flow 900 may be included.

At arrow 920, base station 905 and UE 915 may exchange control signaling. In some examples, base station 905 sends signaling that configures multiple HARQ processes to support communications between base station 905 and UE 915. In some examples, base station 905 indicates to UE 915 that HARQ processes may be reused for uplink grants before an uplink resource scheduled for an initial uplink message occurs.

At block 923, base station 905 may select a set of HARQ processes to support communications between base station 905 and UE 915. In some examples, a quantity of HARQ processes included in the set of HARQ processes is based on a minimum duration for reusing HARQ processes.

At block 925, UE 915 may identify data for transmission to base station 905.

At arrow 928, base station 905 may transmit first uplink grants to UE 915. In some examples, the first uplink grants include identifiers of the set of HARQ processes (E.g., HARQ process 0 to 10). Each uplink grant may include a HARQ process identifier and an NDI. The HARQ process identifier may indicate a HARQ process for an uplink message scheduled by the uplink grant. The NDI may indicate whether the uplink message scheduled by the uplink grant is to include new or repeated data.

At block 930, UE 915 may determine the HARQ processes scheduled for transmitting first uplink messages scheduled by the first uplink grants. In some examples, UE 915 may determine a respective HARQ process for each of the first uplink messages.

At block 933, UE 915 may decode the NDIs in the first uplink grants to determining whether new or retransmitted data is to be included in the first uplink messages. In some examples, UE 915 determines that new data is to be included in an uplink message if the NDI of the corresponding uplink grant is different than (e.g., flipped relative to) the NDI of a preceding uplink message received at UE 815 and associated with the same HARQ process. In other examples, UE 815 may determine that new data is to be included in the uplink message regardless of whether the NDI of the uplink grant is different than the NDI of the preceding uplink grant. In such cases, UE 815 may determine that a failure to receive an intervening uplink grant transmitted between the uplink grants occurred.

At block 935, UE 915 may identify uplink resources for the first uplink messages based on the first uplink grants (and in some examples, a K2 parameter).

At block 938, base station 805 may reuse the HARQ processes used for the first uplink grants to communicate second uplink grants scheduling second uplink messages.

At block 940, base station 805 may update (e.g., flip) NDIs associated with the HARQ processes—e.g., to indicate that new data is to be transmitted in the second uplink messages.

At arrow 943, base station 905 may transmit second uplink grants to UE 915 using the set of HARQ processes and the updated NDI values.

At block 945, UE 915 may determine the HARQ processes scheduled for transmitting second uplink messages scheduled by the first second grants. In some examples, UE 915 may determine a respective HARQ process for each of the second uplink messages.

At block 948, UE 915 may decode the NDIs in the second uplink grants to determine whether new or retransmitted data is to be included in the second uplink messages. In some examples, UE 915 compares the NDIs of the second uplink grants with respective NDIs of the first uplink grants (e.g., NDIs that are associated with a same HARQ process) to determine whether new or retransmitted data is to be included in the second uplink messages. In some examples, UE 915 may determine that new data is to be included in the second uplink messages if the NDIs of the second uplink grants are different than the corresponding NDIs of the first uplink grants.

In other examples, UE 915 may determine that new data is to be included in the second uplink messages regardless of whether the NDIs of the second uplink grants are different than the corresponding NDIs of the first uplink grants. In such cases, UE 915 may determine that an intervening uplink grant was missed between consecutive uplink grants that have the same NDI values and are associated with a same HARQ process.

At block 950, UE 915 may identify second uplink resources for the second uplink messages based on the second uplink grants (and in some examples, a K2 parameter).

At arrow 953, UE 915 may transmit the first uplink messages to base station 905.

At arrow 955, UE 915 may transmit the second uplink messages to base station 905—e.g., based on the NDI values of the second uplink messages being different than the NDI values of the first uplink messages.

At arrow 958, base station 905 may transmit an RLC Status PDU to UE 915. The RLC Status PDU may indicate whether any RLC PDUs in an RLC window have not been received and decoded by base station 905. In some examples, the RLC Status PDU indicates that an RLC PDU associated with a data transmitted in an uplink message has not been received—e.g., based on a failure of the uplink message.

At arrow 960, UE 915 may retransmit the data associated with the RLC PDU (e.g., after retrieving the data from an RLC buffer) as a new data transmission in a subsequent uplink message scheduled by a subsequent uplink grant. In some examples, the subsequent uplink grant indicates a HARQ process to use for the subsequent uplink message that is the same or different than the HARQ process used by the failed uplink message.

Figure 10:
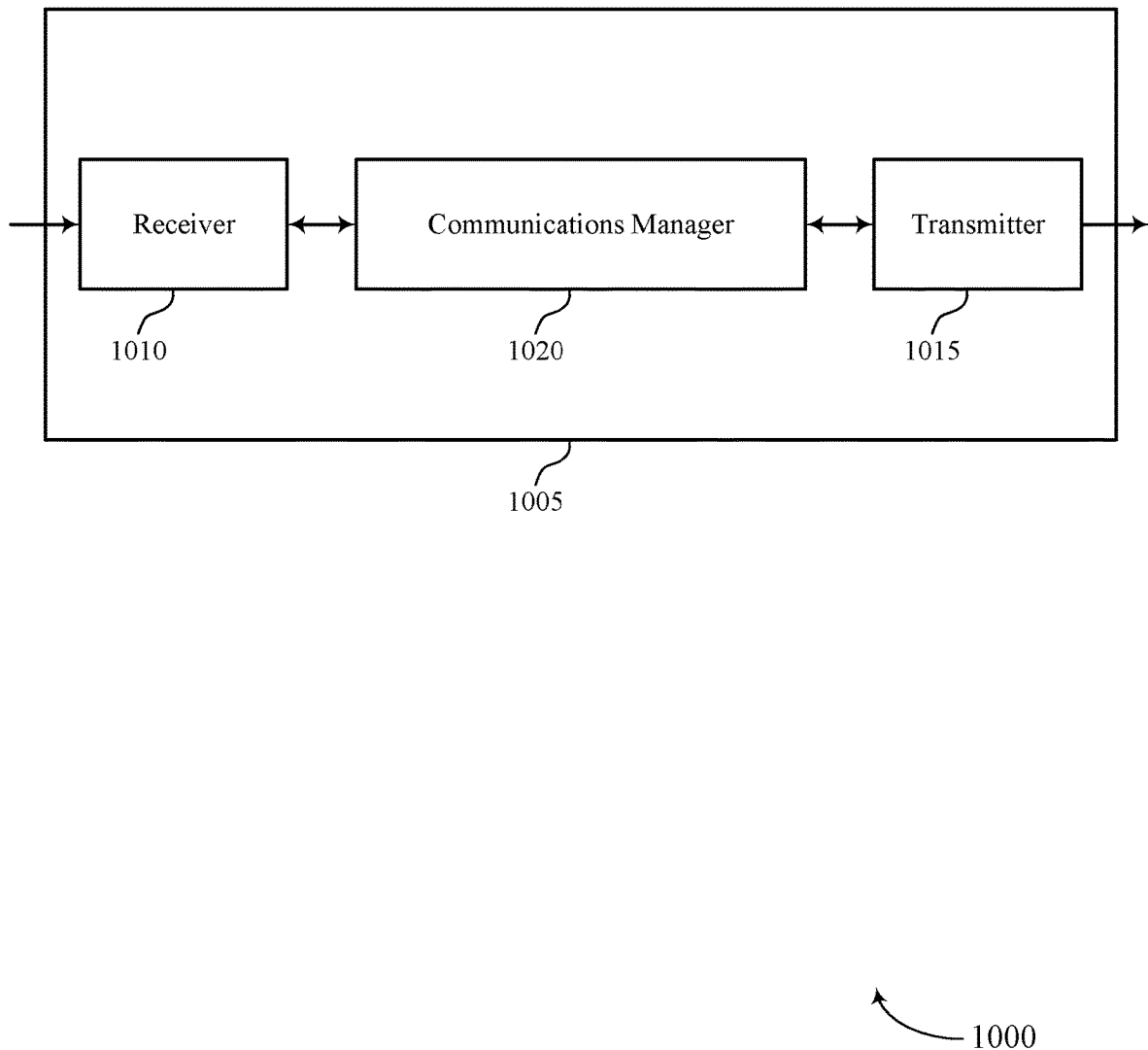
FIGS. 10 and 11 show block diagrams of devices that support feedback process reuse in wireless communications in accordance with aspects of the present disclosure.

FIG. 10 shows a block diagram 1000 of a device 1005 that supports feedback process reuse in wireless communications in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to feedback process reuse in wireless communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to feedback process reuse in wireless communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of feedback process reuse in wireless communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. For example, the communications manager 1020 may be configured as or otherwise support a means for receiving, at a first time, a first downlink message associated with a feedback process identifier, where a first uplink feedback message indicating acknowledgment feedback for the first downlink message is scheduled for a third time after the first time. The communications manager 1020 may be configured as or otherwise support a means for receiving, at a second time that is after the first time and before the third time, a second downlink message associated with the feedback process identifier. The communications manager 1020 may be configured as or otherwise support a means for transmitting, after receiving the first downlink message and the second downlink message, the first uplink feedback message indicating acknowledgment feedback for the first downlink message, a second uplink feedback message indicating acknowledgment feedback for the second downlink message, or any combination thereof.

Additionally, or alternatively, the communications manager 1020 may support wireless communications at a UE in accordance with examples as disclosed herein. For example, the communications manager 1020 may be configured as or otherwise support a means for receiving, at a first time, a first uplink grant associated with a feedback process identifier, where a first uplink message associated with the feedback process identifier is scheduled for a third time after the first time based on the first uplink grant. The communications manager 1020 may be configured as or otherwise support a means for receiving, at a second time that is after the first time and before the third time, a second uplink grant associated with the feedback process identifier, where a second uplink message associated with the feedback process identifier is scheduled for a fourth time after the second time based on the second uplink grant. The communications manager 1020 may be configured as or otherwise support a means for transmitting, to a base station, the first uplink message associated with the feedback process identifier after receiving the second uplink grant associated with the feedback process identifier.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reducing a quantity of HARQ processes used to support communications between communications devices—e.g., when higher subcarrier spacings are used (e.g., 480 KHz or 960 KHz subcarrier spacing. Reducing the quantity of HARQ process may reduce a complexity and processing load associated with processing communications.

Figure 11:
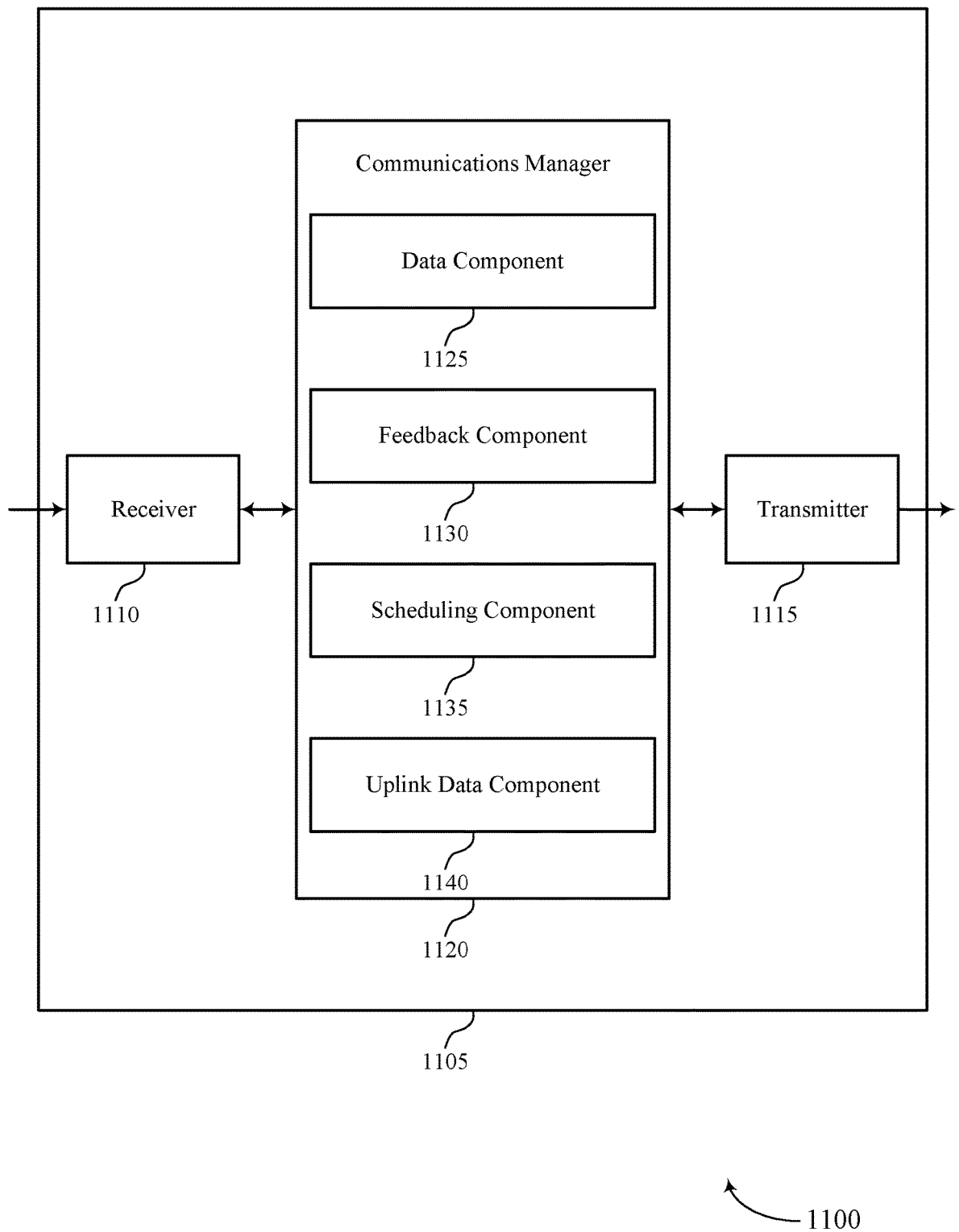

FIG. 11 shows a block diagram 1100 of a device 1105 that supports feedback process reuse in wireless communications in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to feedback process reuse in wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to feedback process reuse in wireless communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of feedback process reuse in wireless communications as described herein. For example, the communications manager 1120 may include a data component 1125, a feedback component 1130, a scheduling component 1135, an uplink data component 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. The data component 1125 may be configured as or otherwise support a means for receiving, at a first time, a first downlink message associated with a feedback process identifier, where a first uplink feedback message indicating acknowledgment feedback for the first downlink message is scheduled for a third time after the first time. The data component 1125 may be configured as or otherwise support a means for receiving, at a second time that is after the first time and before the third time, a second downlink message associated with the feedback process identifier. The feedback component 1130 may be configured as or otherwise support a means for transmitting, after receiving the first downlink message and the second downlink message, the first uplink feedback message indicating acknowledgment feedback for the first downlink message, a second uplink feedback message indicating acknowledgment feedback for the second downlink message, or any combination thereof.

Additionally, or alternatively, the communications manager 1120 may support wireless communications at a UE in accordance with examples as disclosed herein. The scheduling component 1135 may be configured as or otherwise support a means for receiving, at a first time, a first uplink grant associated with a feedback process identifier, where a first uplink message associated with the feedback process identifier is scheduled for a third time after the first time based on the first uplink grant. The scheduling component 1135 may be configured as or otherwise support a means for receiving, at a second time that is after the first time and before the third time, a second uplink grant associated with the feedback process identifier, where a second uplink message associated with the feedback process identifier is scheduled for a fourth time after the second time based on the second uplink grant. The uplink data component 1140 may be configured as or otherwise support a means for transmitting, to a base station, the first uplink message associated with the feedback process identifier after receiving the second uplink grant associated with the feedback process identifier.

Figure 12:
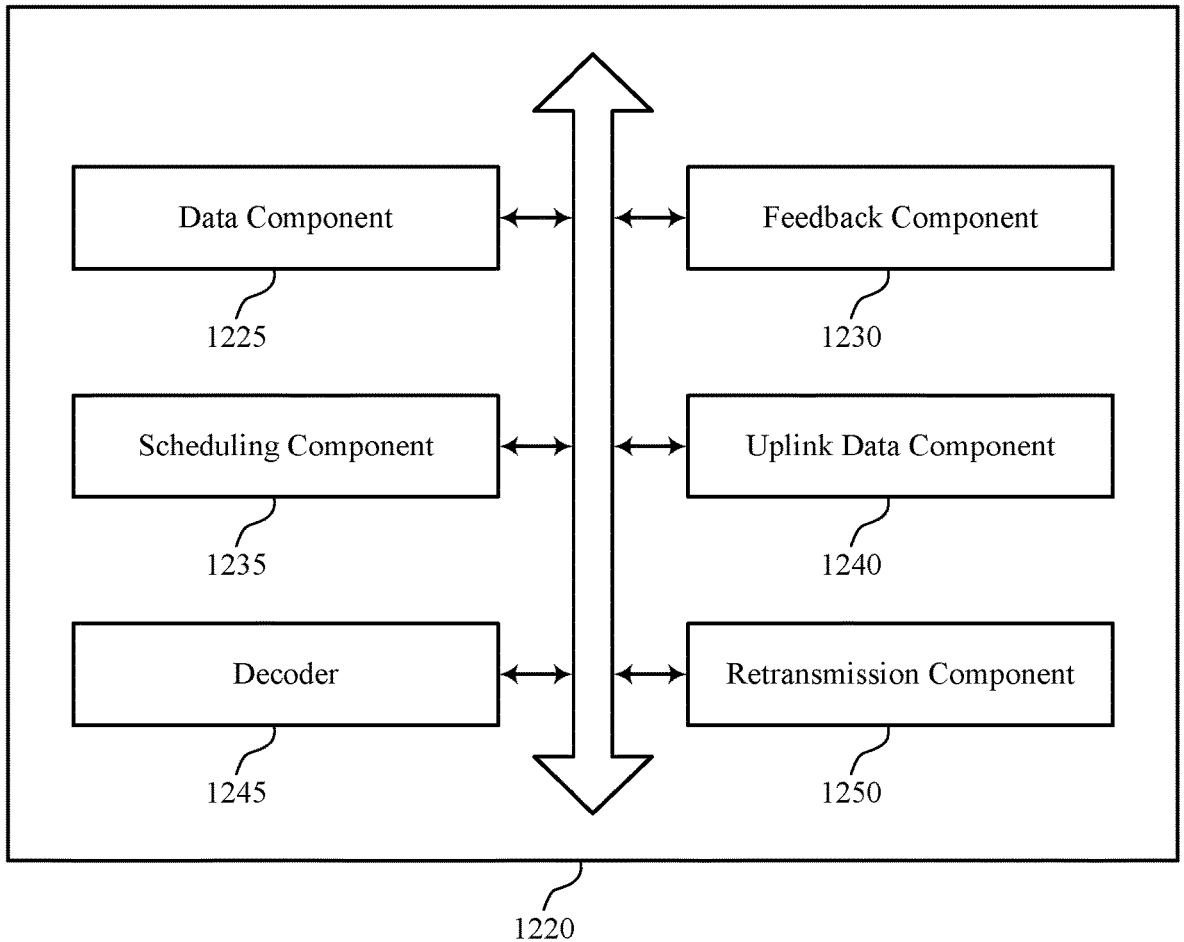
FIG. 12 shows a block diagram of a communications manager that supports feedback process reuse in wireless communications in accordance with aspects of the present disclosure.

FIG. 12 shows a block diagram 1200 of a communications manager 1220 that supports feedback process reuse in wireless communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of feedback process reuse in wireless communications as described herein. For example, the communications manager 1220 may include a data component 1225, a feedback component 1230, a scheduling component 1235, an uplink data component 1240, a decoder 1245, a retransmission component 1250, or any combination thereof. Each of these components may communicate, directly or indirectly, with one another (e.g., via one or more buses).

The communications manager 1220 may support wireless communications at a UE in accordance with examples as disclosed herein. The data component 1225 may be configured as or otherwise support a means for receiving, at a first time, a first downlink message associated with a feedback process identifier, where a first uplink feedback message indicating acknowledgment feedback for the first downlink message is scheduled for a third time after the first time. In some examples, the data component 1225 may be configured as or otherwise support a means for receiving, at a second time that is after the first time and before the third time, a second downlink message associated with the feedback process identifier. The feedback component 1230 may be configured as or otherwise support a means for transmitting, after receiving the first downlink message and the second downlink message, the first uplink feedback message indicating acknowledgment feedback for the first downlink message, a second uplink feedback message indicating acknowledgment feedback for the second downlink message, or any combination thereof.

In some examples, the data component 1225 may be configured as or otherwise support a means for determining that a value of a first new data indicator associated with the first downlink message is different than a value of a second new data indicator associated with the second downlink message. In some examples, the decoder 1245 may be configured as or otherwise support a means for processing data included in the second downlink message as new data relative to data included in the first downlink message based on the value of the first new data indicator being different than the value of the second new data indicator.

In some examples, the data component 1225 may be configured as or otherwise support a means for determining that a value of a first new data indicator associated with the first downlink message matches a value of a second new data indicator associated with the second downlink message. In some examples, the data component 1225 may be configured as or otherwise support a means for determining, based on the value of the first new data indicator matching the value of the second new data indicator, that the UE failed to receive an intervening downlink message associated with the feedback process identifier, the intervening downlink message transmitted between the first downlink message and the second downlink message. In some examples, the decoder 1245 may be configured as or otherwise support a means for processing data included in the second downlink message as new relative to data include in the first downlink message based on determining that the UE failed to receive the intervening downlink message.

In some examples, the decoder 1245 may be configured as or otherwise support a means for decoding the first downlink message, where the transmitting includes transmitting the first uplink feedback message, and where the first uplink feedback message includes an acknowledgment message based on successfully decoding the first downlink message.

In some examples, the second uplink feedback message is scheduled for a fourth time after the third time, and the decoder 1245 may be configured as or otherwise support a means for decoding the second downlink message, where the transmitting includes transmitting the second uplink feedback message after the first uplink feedback message, and where the second uplink feedback message includes a second acknowledgment message based on successfully decoding the second downlink message.

In some examples, the decoder 1245 may be configured as or otherwise support a means for decoding the second downlink message, where the transmitting includes transmitting the second uplink feedback message concurrent with the first uplink feedback message, and where the second uplink feedback message includes a second acknowledgment message based on successfully decoding the second downlink message.

In some examples, the decoder 1245 may be configured as or otherwise support a means for successfully decoding the first downlink message. In some examples, the decoder 1245 may be configured as or otherwise support a means for identifying a failure to decode the second downlink message, where the transmitting includes transmitting the second uplink feedback message and refraining from transmitting the first uplink feedback message, and where the second uplink feedback message includes a negative acknowledgment message corresponding to the feedback process identifier based on the failure to decode the second downlink message.

In some examples, the feedback component 1230 may be configured as or otherwise support a means for receiving a message configuring a mode for indicating acknowledgment feedback on a per-feedback-process basis, where the transmitting includes transmitting an acknowledgment message including a first bit indicating acknowledgment feedback for the first downlink message and a second bit indicating acknowledgment feedback for the second downlink message.

In some examples, the transmitting includes transmitting the first uplink feedback message including a negative acknowledgment message for the first downlink message, and the data component 1225 may be configured as or otherwise support a means for receiving, after transmitting the first uplink feedback message including the negative acknowledgment message for the first downlink message, a third downlink message associated with the feedback process identifier or a second feedback process identifier, where the third downlink message includes data transmitted in the first downlink message based on the negative acknowledgment message.

In some examples, a duration between the first time and the second time satisfies a threshold associated with reusing feedback process identifiers.

In some examples, the feedback process identifier includes a hybrid automatic repeat request process identifier.

Additionally, or alternatively, the communications manager 1220 may support wireless communications at a UE in accordance with examples as disclosed herein. The scheduling component 1235 may be configured as or otherwise support a means for receiving, at a first time, a first uplink grant associated with a feedback process identifier, where a first uplink message associated with the feedback process identifier is scheduled for a third time after the first time based on the first uplink grant. In some examples, the scheduling component 1235 may be configured as or otherwise support a means for receiving, at a second time that is after the first time and before the third time, a second uplink grant associated with the feedback process identifier, where a second uplink message associated with the feedback process identifier is scheduled for a fourth time after the second time based on the second uplink grant. The uplink data component 1240 may be configured as or otherwise support a means for transmitting, to a base station, the first uplink message associated with the feedback process identifier after receiving the second uplink grant associated with the feedback process identifier.

In some examples, the scheduling component 1235 may be configured as or otherwise support a means for determining that a value of a second new data indicator included in the second uplink grant is different than a value of a first new data indicator included in the first uplink grant. In some examples, the uplink data component 1240 may be configured as or otherwise support a means for transmitting the second uplink message associated with the feedback process identifier, where the first uplink message associated with the feedback process identifier includes first data, and where the second uplink message associated with the feedback process identifier includes new data relative to the first data based on the value of the second new data indicator being different than the value of the first new data indicator.

In some examples, a duration between transmitting the first uplink message and the second uplink message satisfies a threshold associated with reusing feedback process identifiers.

In some examples, the scheduling component 1235 may be configured as or otherwise support a means for determining that a value of a second new data indicator included in the second uplink grant matches a value of a first new data indicator included in the first uplink grant. In some examples, the scheduling component 1235 may be configured as or otherwise support a means for identifying, based on the value of the second new data indicator matching the value of the first new data indicator, a failure to receive an intervening uplink grant associated with the feedback process identifier and transmitted between the first uplink grant and the second uplink grant. In some examples, the uplink data component 1240 may be configured as or otherwise support a means for transmitting the second uplink message associated with the feedback process identifier, where the first uplink message associated with the feedback process identifier includes first data, and where the second uplink message associated with the feedback process identifier includes new data relative to the first data based on identifying the failure to receive the intervening uplink grant.

In some examples, the uplink data component 1240 may be configured as or otherwise support a means for removing, from a buffer, data included in the first uplink message based on a value of a second new data indicator included in the second uplink grant being different than a value of a first new data indicator included in the first uplink grant.

In some examples, the retransmission component 1250 may be configured as or otherwise support a means for receiving, via higher-layer signaling, an indication that the data included in the first uplink message was unsuccessfully processed at the base station, where the higher-layer signaling includes packet data convergence protocol layer signaling, radio link control layer signaling, or both. In some examples, the uplink data component 1240 may be configured as or otherwise support a means for retransmitting the data to the base station based on the indication.

In some examples, the scheduling component 1235 may be configured as or otherwise support a means for receiving, after transmitting the first uplink message associated with the feedback process identifier, a third uplink grant associated with the feedback process identifier or a different feedback process identifier, where a third uplink message associated with the feedback process identifier is scheduled based on the third uplink grant, and where retransmitting the data includes transmitting the third uplink message.

In some examples, the feedback process identifier includes a hybrid automatic repeat request process identifier.

Figure 13:
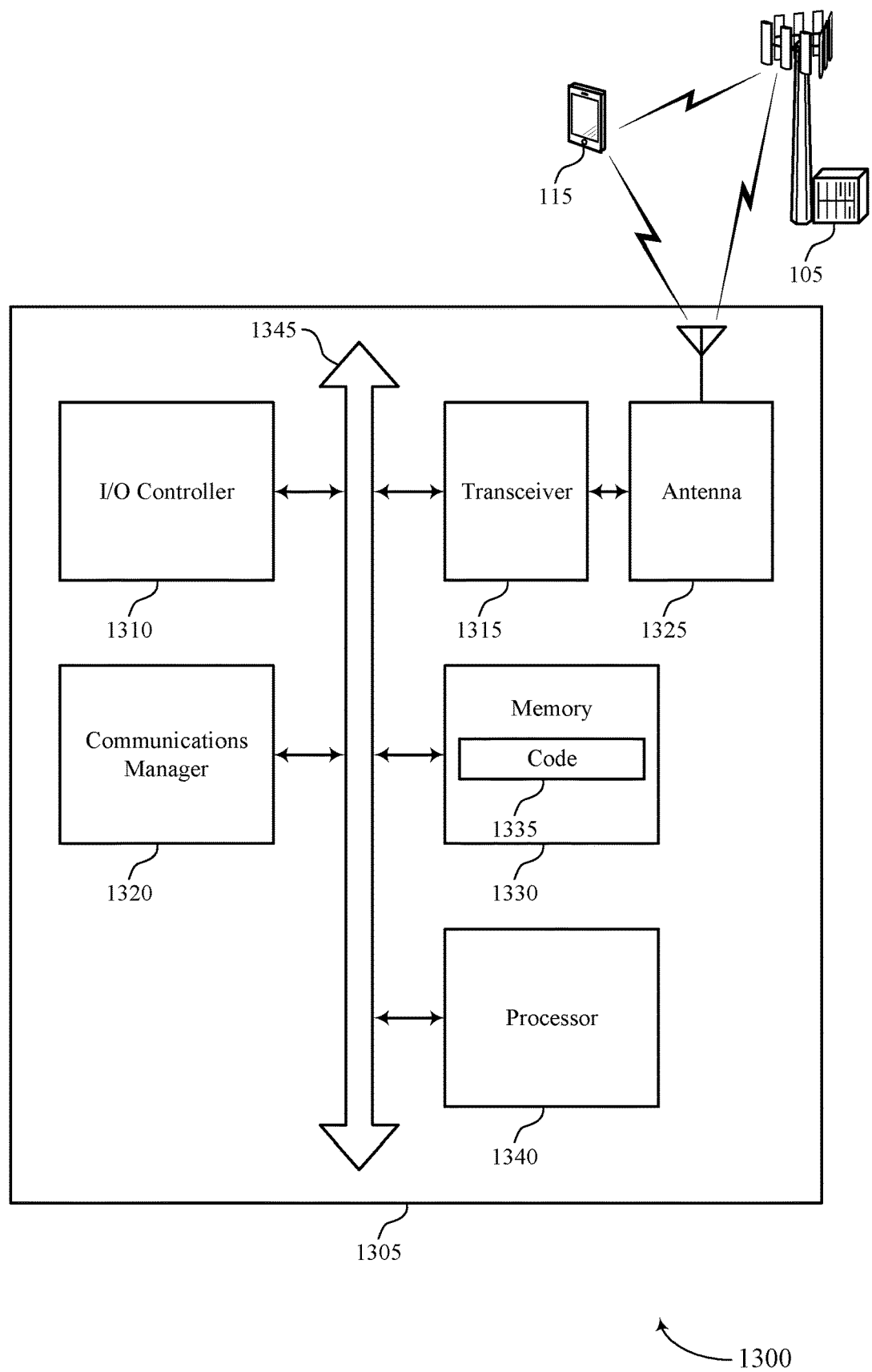
FIG. 13 shows a diagram of a system including a device that supports feedback process reuse in wireless communications in accordance with aspects of the present disclosure.

FIG. 13 shows a diagram of a system 1300 including a device 1305 that supports feedback process reuse in wireless communications in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting feedback process reuse in wireless communications). For example, the device 1305 or a component of the device 1305 may include a processor 1340 and memory 1330 coupled to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, at a first time, a first downlink message associated with a feedback process identifier, where a first uplink feedback message indicating acknowledgment feedback for the first downlink message is scheduled for a third time after the first time. The communications manager 1320 may be configured as or otherwise support a means for receiving, at a second time that is after the first time and before the third time, a second downlink message associated with the feedback process identifier. The communications manager 1320 may be configured as or otherwise support a means for transmitting, after receiving the first downlink message and the second downlink message, the first uplink feedback message indicating acknowledgment feedback for the first downlink message, a second uplink feedback message indicating acknowledgment feedback for the second downlink message, or any combination thereof.

Additionally, or alternatively, the communications manager 1320 may support wireless communications at a UE in accordance with examples as disclosed herein. For example, the communications manager 1320 may be configured as or otherwise support a means for receiving, at a first time, a first uplink grant associated with a feedback process identifier, where a first uplink message associated with the feedback process identifier is scheduled for a third time after the first time based on the first uplink grant. The communications manager 1320 may be configured as or otherwise support a means for receiving, at a second time that is after the first time and before the third time, a second uplink grant associated with the feedback process identifier, where a second uplink message associated with the feedback process identifier is scheduled for a fourth time after the second time based on the second uplink grant. The communications manager 1320 may be configured as or otherwise support a means for transmitting, to a base station, the first uplink message associated with the feedback process identifier after receiving the second uplink grant associated with the feedback process identifier.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of feedback process reuse in wireless communications as described herein, or the processor 1340 and the memory 1330 may be otherwise configured to perform or support such operations.

Figure 14:
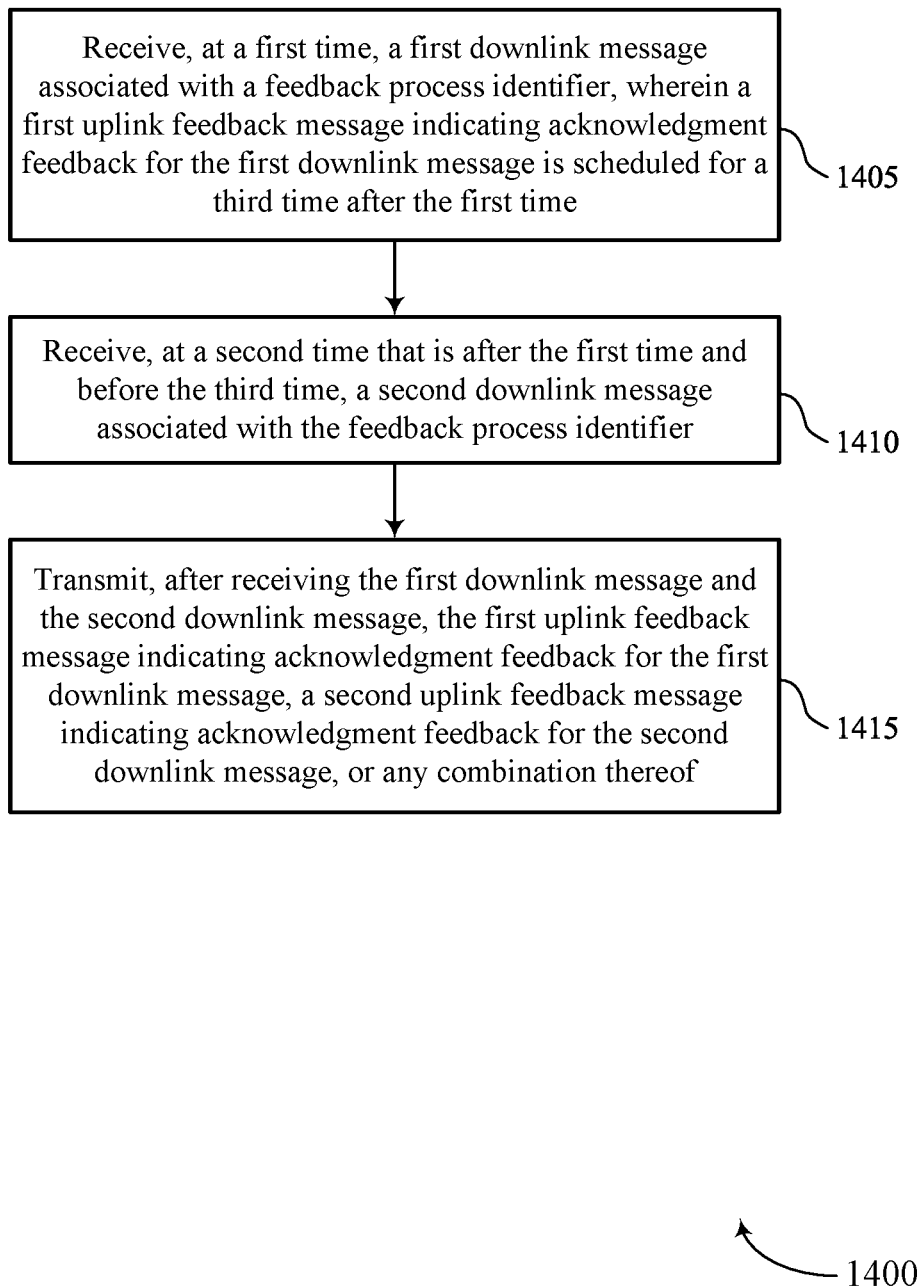
FIGS. 14 and 15 show flowcharts illustrating methods that support feedback process reuse in wireless communications in accordance with aspects of the present disclosure.

FIG. 14 shows a flowchart illustrating a method 1400 that supports feedback process reuse in wireless communications in accordance with aspects of the present disclosure. The operations of the method 1400 may be implemented by a UE or its components as described herein. For example, the operations of the method 1400 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1405, the method may include receiving, at a first time, a first downlink message associated with a feedback process identifier, where a first uplink feedback message indicating acknowledgment feedback for the first downlink message is scheduled for a third time after the first time. The operations of 1405 may be performed in accordance with examples as disclosed herein. In some examples, aspects of the operations of 1405 may be performed by a data component 1225 as described with reference to FIG. 12.

At 1410, the method may include receiving, at a second time that is after the first time and before the third time, a second downlink message associated with the feedback process identifier. The operations of 1410 may be performed in accordance with examples as disclosed herein. In some examples, aspects of the operations of 1410 may be performed by a data component 1225 as described with reference to FIG. 12.

At 1415, the method may include transmitting, after receiving the first downlink message and the second downlink message, the first uplink feedback message indicating acknowledgment feedback for the first downlink message, a second uplink feedback message indicating acknowledgment feedback for the second downlink message, or any combination thereof. The operations of 1415 may be performed in accordance with examples as disclosed herein. In some examples, aspects of the operations of 1415 may be performed by a feedback component 1230 as described with reference to FIG. 12.

Figure 15:
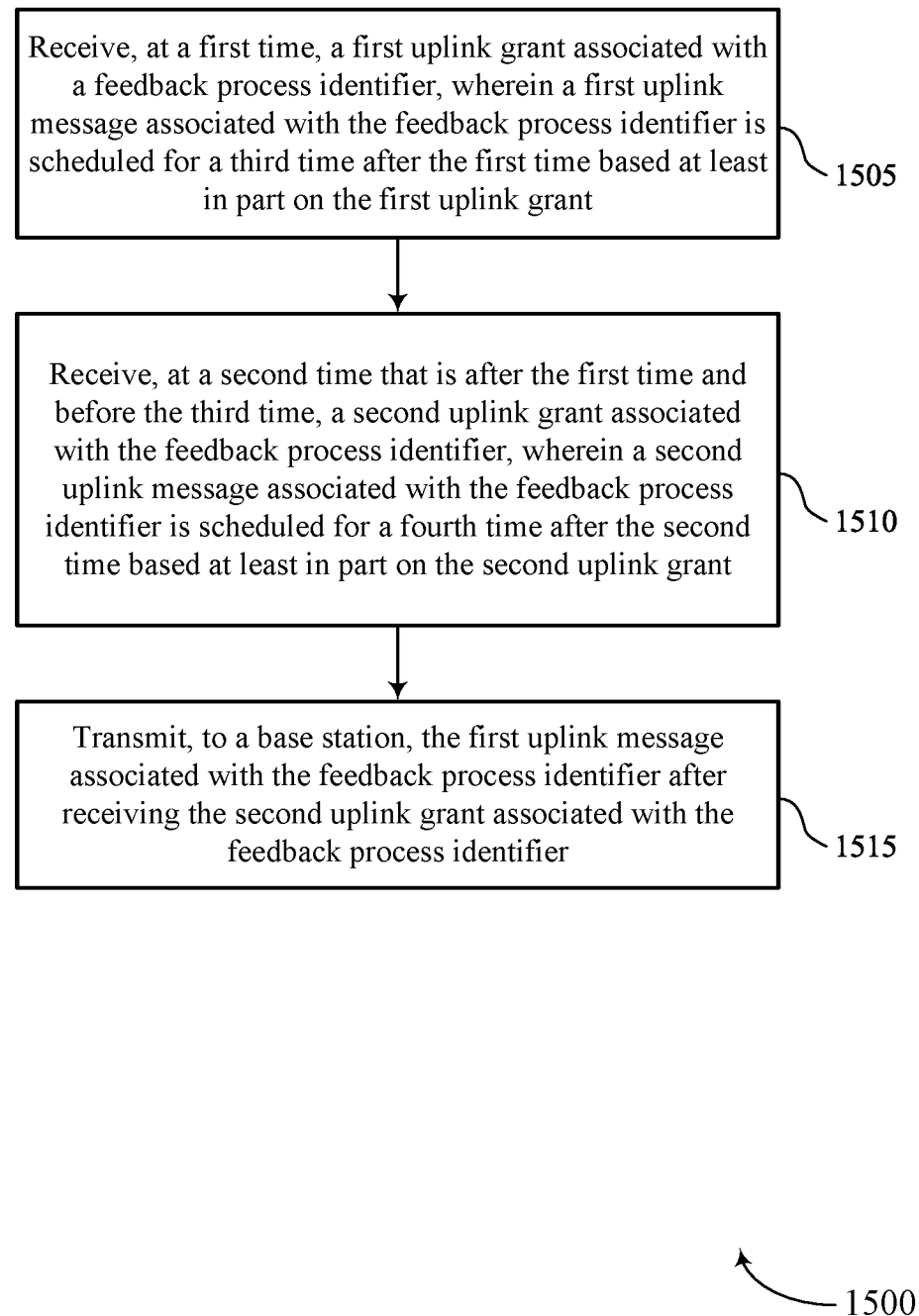

FIG. 15 shows a flowchart illustrating a method 1500 that supports feedback process reuse in wireless communications in accordance with aspects of the present disclosure. The operations of the method 1500 may be implemented by a UE or its components as described herein. For example, the operations of the method 1500 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1505, the method may include receiving, at a first time, a first uplink grant associated with a feedback process identifier, where a first uplink message associated with the feedback process identifier is scheduled for a third time after the first time based on the first uplink grant. The operations of 1505 may be performed in accordance with examples as disclosed herein. In some examples, aspects of the operations of 1505 may be performed by a scheduling component 1235 as described with reference to FIG. 12.

At 1510, the method may include receiving, at a second time that is after the first time and before the third time, a second uplink grant associated with the feedback process identifier, where a second uplink message associated with the feedback process identifier is scheduled for a fourth time after the second time based on the second uplink grant. The operations of 1510 may be performed in accordance with examples as disclosed herein. In some examples, aspects of the operations of 1510 may be performed by a scheduling component 1235 as described with reference to FIG. 12.

At 1515, the method may include transmitting, to a base station, the first uplink message associated with the feedback process identifier after receiving the second uplink grant associated with the feedback process identifier. The operations of 1515 may be performed in accordance with examples as disclosed herein. In some examples, aspects of the operations of 1515 may be performed by an uplink data component 1240 as described with reference to FIG. 12.

The following provides an overview of aspects of the present disclosure:

Aspect 1: A method for wireless communications at a UE, comprising: receiving, at a first time, a first downlink message associated with a feedback process identifier, wherein a first uplink feedback message indicating acknowledgment feedback for the first downlink message is scheduled for a third time after the first time; receiving, at a second time that is after the first time and before the third time, a second downlink message associated with the feedback process identifier; and transmitting, after receiving the first downlink message and the second downlink message, the first uplink feedback message indicating acknowledgment feedback for the first downlink message, a second uplink feedback message indicating acknowledgment feedback for the second downlink message, or any combination thereof.

Aspect 2: The method of aspect 1, further comprising: determining that a value of a first new data indicator associated with the first downlink message is different than a value of a second new data indicator associated with the second downlink message; and processing data included in the second downlink message as new data relative to data included in the first downlink message based at least in part on the value of the first new data indicator being different than the value of the second new data indicator.

Aspect 3: The method of aspect 1, further comprising: determining that a value of a first new data indicator associated with the first downlink message matches a value of a second new data indicator associated with the second downlink message; determining, based at least in part on the value of the first new data indicator matching the value of the second new data indicator, that the UE failed to receive an intervening downlink message associated with the feedback process identifier, the intervening downlink message transmitted between the first downlink message and the second downlink message; and processing data included in the second downlink message as new relative to data include in the first downlink message based at least in part on determining that the UE failed to receive the intervening downlink message.

Aspect 4: The method of any of aspects 1 through 3, further comprising: decoding the first downlink message, wherein the transmitting comprises transmitting the first uplink feedback message, and wherein the first uplink feedback message comprises an acknowledgment message based at least in part on successfully decoding the first downlink message.

Aspect 5: The method of aspect 4, wherein the second uplink feedback message is scheduled for a fourth time after the third time, the method further comprising: decoding the second downlink message, wherein the transmitting comprises transmitting the second uplink feedback message after the first uplink feedback message, and wherein the second uplink feedback message comprises a second acknowledgment message based at least in part on successfully decoding the second downlink message.

Aspect 6: The method of any of aspects 4 through 5, further comprising: decoding the second downlink message, wherein the transmitting comprises transmitting the second uplink feedback message concurrent with the first uplink feedback message, and wherein the second uplink feedback message comprises a second acknowledgment message based at least in part on successfully decoding the second downlink message.

Aspect 7: The method of any of aspects 1 through 4, further comprising: successfully decoding the first downlink message; and identifying a failure to decode the second downlink message, wherein the transmitting comprises transmitting the second uplink feedback message and refraining from transmitting the first uplink feedback message, and wherein the second uplink feedback message comprises a negative acknowledgment message corresponding to the feedback process identifier based at least in part on the failure to decode the second downlink message.

Aspect 8: The method of any of aspects 1 through 7, further comprising: receiving a message configuring a mode for indicating acknowledgment feedback on a per-feedback-process basis, wherein the transmitting comprises transmitting an acknowledgment message comprising a first bit indicating acknowledgment feedback for the first downlink message and a second bit indicating acknowledgment feedback for the second downlink message.

Aspect 9: The method of aspect 1, wherein the transmitting comprises transmitting the first uplink feedback message comprising a negative acknowledgment message for the first downlink message, the method further comprising: receiving, after transmitting the first uplink feedback message comprising the negative acknowledgment message for the first downlink message, a third downlink message associated with the feedback process identifier or a second feedback process identifier, wherein the third downlink message comprises data transmitted in the first downlink message based at least in part on the negative acknowledgment message.

Aspect 10: The method of any of aspects 1 through 9, wherein a duration between the first time and the second time satisfies a threshold associated with reusing feedback process identifiers.

Aspect 11: The method of any of aspects 1 through 10, wherein the feedback process identifier comprises a hybrid automatic repeat request process identifier.

Aspect 12: A method for wireless communications at a UE, comprising: receiving, at a first time, a first uplink grant associated with a feedback process identifier, wherein a first uplink message associated with the feedback process identifier is scheduled for a third time after the first time based at least in part on the first uplink grant; and receiving, at a second time that is after the first time and before the third time, a second uplink grant associated with the feedback process identifier, wherein a second uplink message associated with the feedback process identifier is scheduled for a fourth time after the second time based at least in part on the second uplink grant; and transmitting, to a base station, the first uplink message associated with the feedback process identifier after receiving the second uplink grant associated with the feedback process identifier.

Aspect 13: The method of aspect 12, further comprising: determining that a value of a second new data indicator included in the second uplink grant is different than a value of a first new data indicator included in the first uplink grant; and transmitting the second uplink message associated with the feedback process identifier, wherein the first uplink message associated with the feedback process identifier comprises first data, and wherein the second uplink message associated with the feedback process identifier comprises new data relative to the first data based at least in part on the value of the second new data indicator being different than the value of the first new data indicator.

Aspect 14: The method of aspect 13, wherein a duration between transmitting the first uplink message and the second uplink message satisfies a threshold associated with reusing feedback process identifiers.

Aspect 15: The method of aspect 12, further comprising: determining that a value of a second new data indicator included in the second uplink grant matches a value of a first new data indicator included in the first uplink grant; identifying, based at least in part on the value of the second new data indicator matching the value of the first new data indicator, a failure to receive an intervening uplink grant associated with the feedback process identifier and transmitted between the first uplink grant and the second uplink grant; transmitting the second uplink message associated with the feedback process identifier, wherein the first uplink message associated with the feedback process identifier comprises first data, and wherein the second uplink message associated with the feedback process identifier comprises new data relative to the first data based at least in part on identifying the failure to receive the intervening uplink grant.

Aspect 16: The method of any of aspects 12 through 14, further comprising: removing, from a buffer, data included in the first uplink message based at least in part on a value of a second new data indicator included in the second uplink grant being different than a value of a first new data indicator included in the first uplink grant.

Aspect 17: The method of aspect 16, further comprising: receiving, via higher-layer signaling, an indication that the data included in the first uplink message was unsuccessfully processed at the base station, wherein the higher-layer signaling comprises packet data convergence protocol layer signaling, radio link control layer signaling, or both; and retransmitting the data to the base station based at least in part on the indication.

Aspect 18: The method of aspect 17, further comprising: receiving, after transmitting the first uplink message associated with the feedback process identifier, a third uplink grant associated with the feedback process identifier or a different feedback process identifier, wherein a third uplink message associated with the feedback process identifier is scheduled based at least in part on the third uplink grant, and wherein retransmitting the data comprises transmitting the third uplink message.

Aspect 19: The method of any of aspects 12 through 18, wherein the feedback process identifier comprises a hybrid automatic repeat request process identifier.

Aspect 20: An apparatus for wireless communications at a UE, comprising a processor; memory coupled with the processor; and instructions stored in the memory and executable by the processor to cause the apparatus to perform a method of any of aspects 1 through 11.

Aspect 21: An apparatus for wireless communications at a UE, comprising at least one means for performing a method of any of aspects 1 through 11.

Aspect 22: A non-transitory computer-readable medium storing code for wireless communications at a UE, the code comprising instructions executable by a processor to perform a method of any of aspects 1 through 11.

Aspect 23: An apparatus for wireless communications at a UE, comprising a processor; memory coupled with the processor; and instructions stored in the memory and executable by the processor to cause the apparatus to perform a method of any of aspects 12 through 19.

Aspect 24: An apparatus for wireless communications at a UE, comprising at least one means for performing a method of any of aspects 12 through 19.

Aspect 25: A non-transitory computer-readable medium storing code for wireless communications at a UE, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, at a first time, a first downlink message comprising first user data for the UE and a first indication that a feedback process identifier is assigned to the first user data, wherein a first uplink feedback message indicating acknowledgment feedback for the first user data in the first downlink message is scheduled for a third time after the first time;
   receiving, at a second time that is after the first time and before the third time, a second downlink message comprising second user data for the UE and a second indication that the feedback process identifier is assigned to the second user data; and
   transmitting, after receiving the first downlink message and the second downlink message, the first uplink feedback message indicating the acknowledgment feedback for the first user data in the first downlink message during the third time, a second uplink feedback message indicating acknowledgment feedback for the second user data in the second downlink message, or any combination thereof.

2. The method of claim 1, further comprising:
   determining that a value of a first new data indicator associated with the first downlink message is different than a value of a second new data indicator associated with the second downlink message; and
   processing data included in the second downlink message as new data relative to data included in the first downlink message based at least in part on the value of the first new data indicator being different than the value of the second new data indicator.

3. The method of claim 1, further comprising:
   determining that a value of a first new data indicator associated with the first downlink message matches a value of a second new data indicator associated with the second downlink message;
   determining, based at least in part on the value of the first new data indicator matching the value of the second new data indicator, that the UE failed to receive an intervening downlink message associated with the feedback process identifier, the intervening downlink message transmitted between the first downlink message and the second downlink message; and
   processing data included in the second downlink message as new data relative to data included in the first downlink message based at least in part on determining that the UE failed to receive the intervening downlink message.

4. The method of claim 1, further comprising:
   decoding the first downlink message, wherein the transmitting comprises transmitting the first uplink feedback message, and wherein the first uplink feedback message comprises an acknowledgment message based at least in part on successfully decoding the first downlink message.

5. The method of claim 4, wherein the second uplink feedback message is scheduled for a fourth time after the third time, the method further comprising:
   decoding the second downlink message, wherein the transmitting comprises transmitting the second uplink feedback message after the first uplink feedback message, and wherein the second uplink feedback message comprises a second acknowledgment message based at least in part on successfully decoding the second downlink message.

6. The method of claim 4, further comprising:
   decoding the second downlink message, wherein the transmitting comprises transmitting the second uplink feedback message concurrent with the first uplink feedback message, and wherein the second uplink feedback message comprises a second acknowledgment message based at least in part on successfully decoding the second downlink message.

7. The method of claim 1, further comprising:
successfully decoding the first downlink message; and
identifying a failure to decode the second downlink message, wherein the transmitting comprises transmitting the second uplink feedback message and refraining from transmitting the first uplink feedback message, and wherein the second uplink feedback message comprises a negative acknowledgment message corresponding to the feedback process identifier based at least in part on the failure to decode the second downlink message.

8. The method of claim 1, further comprising:
receiving a message configuring a mode for indicating acknowledgment feedback on a per-feedback-process basis, wherein the transmitting comprises transmitting an acknowledgment message comprising a first bit indicating the acknowledgment feedback for the first user data in the first downlink message and a second bit indicating the acknowledgment feedback for the second user data in the second downlink message.

9. The method of claim 1, wherein the transmitting comprises transmitting the first uplink feedback message comprising a negative acknowledgment message for the first downlink message, the method further comprising:
receiving, after transmitting the first uplink feedback message comprising the negative acknowledgment message for the first downlink message, a third downlink message associated with the feedback process identifier or a second feedback process identifier, wherein the third downlink message comprises data transmitted in the first downlink message based at least in part on the negative acknowledgment message.

10. The method of claim 1, wherein a duration between the first time and the second time satisfies a threshold associated with reusing feedback process identifiers.

11. The method of claim 1, wherein the feedback process identifier comprises a hybrid automatic repeat request process identifier.

12. A method for wireless communications at a user equipment (UE), comprising:
receiving, at a first time, a first uplink grant indicating that a feedback process identifier is assigned to first user data of a first uplink message scheduled by the first uplink grant for a third time that is after the first time;
receiving, at a second time that is after the first time and before the third time, a second uplink grant indicating that the feedback process identifier is assigned to second user data of a second uplink message scheduled by the second uplink grant for a fourth time that is after the second time; and
transmitting, to a base station, the first uplink message associated with the feedback process identifier at the third time and after receiving the second uplink grant associated with the feedback process identifier.

13. The method of claim 12, further comprising:
determining that a value of a second new data indicator included in the second uplink grant is different than a value of a first new data indicator included in the first uplink grant; and
transmitting the second uplink message associated with the feedback process identifier, wherein the first uplink message associated with the feedback process identifier comprises first data, and wherein the second uplink message associated with the feedback process identifier comprises new data relative to the first data based at least in part on the value of the second new data indicator being different than the value of the first new data indicator.

14. The method of claim 13, wherein a duration between transmitting the first uplink message and the second uplink message satisfies a threshold associated with reusing feedback process identifiers.

15. The method of claim 12, further comprising:
determining that a value of a second new data indicator included in the second uplink grant matches a value of a first new data indicator included in the first uplink grant;
identifying, based at least in part on the value of the second new data indicator matching the value of the first new data indicator, a failure to receive an intervening uplink grant associated with the feedback process identifier and transmitted between the first uplink grant and the second uplink grant; and
transmitting the second uplink message associated with the feedback process identifier, wherein the first uplink message associated with the feedback process identifier comprises first data, and wherein the second uplink message associated with the feedback process identifier comprises new data relative to the first data based at least in part on identifying the failure to receive the intervening uplink grant.

16. The method of claim 12, further comprising:
removing, from a buffer, data included in the first uplink message based at least in part on a value of a second new data indicator included in the second uplink grant being different than a value of a first new data indicator included in the first uplink grant.

17. The method of claim 16, further comprising:
receiving, via higher-layer signaling, an indication that the data included in the first uplink message was unsuccessfully processed at the base station, wherein the higher-layer signaling comprises packet data convergence protocol layer signaling, radio link control layer signaling, or both; and
retransmitting the data to the base station based at least in part on the indication.

18. The method of claim 17, further comprising:
receiving, after transmitting the first uplink message associated with the feedback process identifier, a third uplink grant associated with the feedback process identifier or a different feedback process identifier, wherein a third uplink message associated with the feedback process identifier is scheduled based at least in part on the third uplink grant, and wherein retransmitting the data comprises transmitting the third uplink message.

19. The method of claim 12, wherein the feedback process identifier comprises a hybrid automatic repeat request process identifier.

20. An apparatus for wireless communications at a user equipment (UE), comprising:
one or more processors;
one or more memories coupled with the one or more processors; and
instructions stored in the one or more memories and executable by the processor one or more processors to cause the apparatus to:
receive, at a first time, a first downlink message comprising first user data for the UE and a first indication that a feedback process identifier is assigned to the first user data, wherein a first uplink feedback message indicating acknowledgment feedback for the first user data in the first downlink message is scheduled for a third time after the first time;

receive, at a second time that is after the first time and before the third time, a second downlink message comprising second user data for the UE and a second indication that the feedback process identifier is assigned to the second user data; and transmit, after receiving the first downlink message and the second downlink message, the first uplink feedback message indicating the acknowledgment feedback for the first user data in the first downlink message, a second uplink feedback message indicating acknowledgment feedback for the second user data in the second downlink message, or any combination thereof.

21. The apparatus of claim 20, wherein the instructions are further executable by the one or more processors to cause the apparatus to:

determine that a value of a first new data indicator associated with the first downlink message is different than a value of a second new data indicator associated with the second downlink message; and process data included in the second downlink message as new data relative to data included in the first downlink message based at least in part on the value of the first new data indicator being different than the value of the second new data indicator.

22. The apparatus of claim 20, wherein the instructions are further executable by the one or more processors to cause the apparatus to:

determine that a value of a first new data indicator associated with the first downlink message matches a value of a second new data indicator associated with the second downlink message;

determine, based at least in part on the value of the first new data indicator matching the value of the second new data indicator, that the UE failed to receive an intervening downlink message associated with the feedback process identifier, the intervening downlink message transmitted between the first downlink message and the second downlink message; and process data included in the second downlink message as new data relative to data included in the first downlink message based at least in part on determining that the UE failed to receive the intervening downlink message.

23. The apparatus of claim 20, wherein the instructions are further executable by the one or more processors to cause the apparatus to:

decode the first downlink message, wherein the transmitting comprises transmitting the first uplink feedback message, and wherein the first uplink feedback message comprises an acknowledgment message based at least in part on successfully decoding the first downlink message.

24. The apparatus of claim 23, wherein the second uplink feedback message is scheduled for a fourth time after the third time, and the instructions are further executable by the one or more processors to cause the apparatus to:

decode the second downlink message, wherein the transmitting comprises transmitting the second uplink feedback message after the first uplink feedback message, and wherein the second uplink feedback message comprises a second acknowledgment message based at least in part on successfully decoding the second downlink message.

25. The apparatus of claim 23, wherein the instructions are further executable by the one or more processors to cause the apparatus to:

decode the second downlink message, wherein the transmitting comprises transmitting the second uplink feedback message concurrent with the first uplink feedback message, and wherein the second uplink feedback message comprises a second acknowledgment message based at least in part on successfully decoding the second downlink message.

26. The apparatus of claim 20, wherein the instructions are further executable by the one or more processors to cause the apparatus to:

successfully decode the first downlink message; and identify a failure to decode the second downlink message, wherein the transmitting comprises transmitting the second uplink feedback message and refraining from transmitting the first uplink feedback message, and wherein the second uplink feedback message comprises a negative acknowledgment message corresponding to the feedback process identifier based at least in part on the failure to decode the second downlink message.

27. An apparatus for wireless communications at a user equipment (UE), comprising:

one or more processors;

one or more memories coupled with the one or more processors; and instructions stored in the one or more memories and executable by the one or more processors to cause the apparatus to:

receive, at a first time, a first uplink grant indicating that a feedback process identifier is assigned to first user data of a first uplink message scheduled by the first uplink grant for a third time that is after the first time;

receive, at a second time that is after the first time and before the third time, a second uplink grant indicating that the feedback process identifier is assigned to second user data of a second uplink message scheduled by the second uplink grant for a fourth time that is after the second time; and transmit, to a base station, the first uplink message associated with the feedback process identifier at the third time and after receiving the second uplink grant associated with the feedback process identifier.

28. The apparatus of claim 27, wherein the instructions are further executable by the one or more processors to cause the apparatus to:

determine that a value of a second new data indicator included in the second uplink grant is different than a value of a first new data indicator included in the first uplink grant; and transmit the second uplink message associated with the feedback process identifier, wherein the first uplink message associated with the feedback process identifier comprises first data, and wherein the second uplink message associated with the feedback process identifier comprises new data relative to the first data based at least in part on the value of the second new data indicator being different than the value of the first new data indicator.

29. The apparatus of claim 28, wherein a duration between transmitting the first uplink message and the second uplink message satisfies a threshold associated with reusing feedback process identifiers.

30. The apparatus of claim 27, wherein the instructions are further executable by the one or more processors to cause the apparatus to:
- determine that a value of a second new data indicator included in the second uplink grant matches a value of a first new data indicator included in the first uplink grant;
- identify, based at least in part on the value of the second new data indicator matching the value of the first new data indicator, a failure to receive an intervening uplink grant associated with the feedback process identifier and transmitted between the first uplink grant and the second uplink grant; and
- transmit the second uplink message associated with the feedback process identifier, wherein the first uplink message associated with the feedback process identifier comprises first data, and wherein the second uplink message associated with the feedback process identifier comprises new data relative to the first data based at least in part on identifying the failure to receive the intervening uplink grant.

\* \* \* \* \*